United States Patent
Rubin

(10) Patent No.: US 7,089,532 B2
(45) Date of Patent: *Aug. 8, 2006

(54) OBJECT ORIENTED INFORMATION RETRIEVAL FRAMEWORK MECHANISM

(75) Inventor: Bradley Scott Rubin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 749 days.

This patent is subject to a terminal disclaimer.

(21) Appl. No.: 10/037,199

(22) Filed: Jan. 4, 2002

(65) Prior Publication Data

US 2002/0065957 A1    May 30, 2002

Related U.S. Application Data

(62) Division of application No. 09/081,174, filed on May 19, 1998, which is a division of application No. 08/639,589, filed on Apr. 30, 1996, now Pat. No. 5,778,378.

(51) Int. Cl.
G06F 9/44    (2006.01)

(52) U.S. Cl. .................................. 717/116; 707/6

(58) Field of Classification Search ............... 717/116; 706/54; 707/4, 103, 6
See application file for complete search history.

(56) References Cited

U.S. PATENT DOCUMENTS

| | | | | |
|---|---|---|---|---|
| 5,278,954 A * | 1/1994 | Hohlfeld et al. | ............. | 707/100 |
| 5,278,980 A * | 1/1994 | Pedersen et al. | ................ | 707/4 |
| 5,608,904 A * | 3/1997 | Chaudhuri et al. | ............. | 707/2 |
| 5,623,679 A * | 4/1997 | Rivette et al. | ............... | 715/526 |
| 5,768,580 A * | 6/1998 | Wical | ......................... | 707/102 |
| 5,778,378 A * | 7/1998 | Rubin | ..................... | 707/103 R |
| 5,819,251 A * | 10/1998 | Kremer et al. | ................. | 707/1 |
| 5,850,442 A * | 12/1998 | Muftic | ......................... | 705/65 |
| 6,081,798 A * | 6/2000 | Johnson et al. | ............... | 706/54 |
| 6,298,476 B1 * | 10/2001 | Misheski et al. | ........... | 717/101 |
| 6,434,739 B1 * | 8/2002 | Branson et al. | ............. | 717/108 |

(Continued)

OTHER PUBLICATIONS

D C Schmidt and T Suda, "An object-oriented framework for dynamically configuring extensible distributed systems", Dept. of Comput. Sci., Washington Univ., St. Louis, MO, USA, Sep. 1994, pp. 280-293.*

Primary Examiner—Wei Zhen
Assistant Examiner—Mary Steelman
(74) Attorney, Agent, or Firm—Martin & Associates, LLC; Derek P. Martin

(57) ABSTRACT

A framework for use with object-oriented programming systems provides a reusable object oriented (OO) framework for use with object oriented programming systems that provides an information retrieval (IR) shell that permits a framework user to define an index class that includes word index objects and provides an extensible information retrieval system that evaluates a user query by comparing information contained in the user query with information contained in the word index objects that relates to stored documents. The information in word index objects is produced by preprocessing operations on documents such that the documents relevant to the user query will be identified, thereby providing a query result. The information retrieval system user can load documents into the computer system storage, index documents so their information can be subject to a query search, and request query evaluation to identify and retrieve documents most closely related to the subject matter of a user query.

21 Claims, 20 Drawing Sheets

U.S. PATENT DOCUMENTS 6,449,660 B1 * 9/2002 Berg et al. ..................... 710/1

6,457,018 B1 * 9/2002 Rubin ........................... 707/4

* cited by examiner

OBJECT ORIENTED INFORMATION RETRIEVAL FRAMEWORK MECHANISM

REFERENCE TO PARENT APPLICATIONS

This application is a divisional of U.S. Ser. No. 09/081,174, filed on May 19, 1998 by Bradley Scott Rubin, and entitled "Object Oriented Information Retrieval Framework Mechanism", which was a divisional of U.S. Ser. No. 08/639,589, filed Apr. 30, 1996 now U.S. Pat. No. 5,778,378 that has the same title and that issued on Jul. 7, 1998 to Bradley Scott Rubin. Both of these parent applications are hereby incorporated by reference.

BACKGROUND OF THE INVENTION

1. Field of the Invention

The present invention relates generally to data processing and, more specifically, to object-oriented programming systems and processes.

2. Description of the Related Art

An information retrieval (IR) system typically receives a text-based query that defines subject matter of interest to a user. The system then compares the query to text stored in system memory, such as disk storage, and locates the documents that most closely match the subject matter of interest, which are then presented to the user. Such systems, however, are frequently inflexible. That is, they cannot be easily modified to provide components that accommodate changing user needs.

In addition, the document types that are supported by IR systems typically are fixed and inflexible. An IR system might efficiently support different types of text documents created, for example, using different word processing formats, but could not be easily adapted to accommodate newly developed formats.

Adapting an IR system to new text representation formats would be difficult because new lines of code for parsing and editing of the new text format, to name just two changes, would have to be carefully developed and woven into the programming steps of the IR system. Virtually every text operation of the IR system would have to be supplemented with a corresponding new operation to accommodate the new format. In addition, the presence of the new format would have to be detected. Incorporating the new code with the old code so the changes are seamless and the IR system works properly, without "hidden" problems or bugs, can be extremely difficult, time consuming, and expensive. Moreover, IR system maintenance as the new code is added can become quite problematic.

Information retrieval systems can support query processing on documents of different information types, but again can be quite difficult to modify so as to support new types of documents. For example, an IR system might support information retrieval operations on text documents and image documents that contain digital representations of images that can be processed by applications programs that create corresponding text descriptions of the images. The user of such an IR system could thereby perform information retrieval on text documents and images, but again would face extreme difficulty in modifying the IR system to perform IR operations on a HyperText Mark-Up Language (HTML) type of document.

As new forms of data are used to store and represent information, such as HTML, it will become more challenging for information retrieval systems to provide efficient, simple operation and also have the flexibility to be easily adapted to new forms of information containing documents.

From the discussion above, it should be apparent that there is a need for an information retrieval system development mechanism tool that provides a basis for more rapid, less expensive, and simpler development of information retrieval systems with greater user flexibility. The present invention satisfies this need.

SUMMARY OF THE INVENTION

In accordance with the present invention, a reusable object oriented (OO) framework for use with object oriented programming systems comprises an information retrieval (IR) shell that permits a framework user to define an index class that includes word index objects and provides an extensible information retrieval system that evaluates a user query by comparing information contained in the user query with information contained in the word index objects that relates to stored documents. The information in word index objects is produced by preprocessing operations on documents such that documents relevant to the user query will be identified, thereby providing a query result. Because the word index information is stored in object oriented data structures, modifications to the IR system data structures are easily accommodated by the system operating environment. The information retrieval system user can load documents into the computer system storage, index documents so their information can be subject to a query search, and request query evaluation to identify and retrieve documents most closely related to the subject matter of a user query.

In one aspect of the IR system, the documents are stored in the computer system as instances of an object oriented, extensible, binary-large-object class having document objects that contain text information or binary document objects that contain a digital representation of information other than text. The binary documents can contain, for example, image data, video data, or audio data. Because the binary documents are members of an extensible class, new document types can be easily defined by the framework user. In this way, the framework provides an information retrieval system that can be adapted to new document types and generally adapted more quickly and at reduced expense. In another aspect of the invention, the framework includes a document table class of objects that map a document handle to the indexed document from which it was preprocessed. This permits easier addition and deletion of documents from the IR system.

In yet another aspect of the invention, each binary document object is linked to a document object containing text information relating to the non-text information contained in the binary document object. In another aspect of the invention, the various components of the IR system are implemented as object oriented class members, so that the IR system includes a load document object that stores documents into the memory of the system, a build index object that processes a document so as to create the word index objects, and a query index object that processes a user query so as to produce a query result from comparison of the user query and the word index objects in response to a user query.

Other features and advantages of the present invention should be apparent from the following description of the preferred embodiment, which illustrates, by way of example, the principles of the invention.

DESCRIPTION OF THE PREFERRED EMBODIMENT

Overview—Object Oriented Technology

Figure 1:
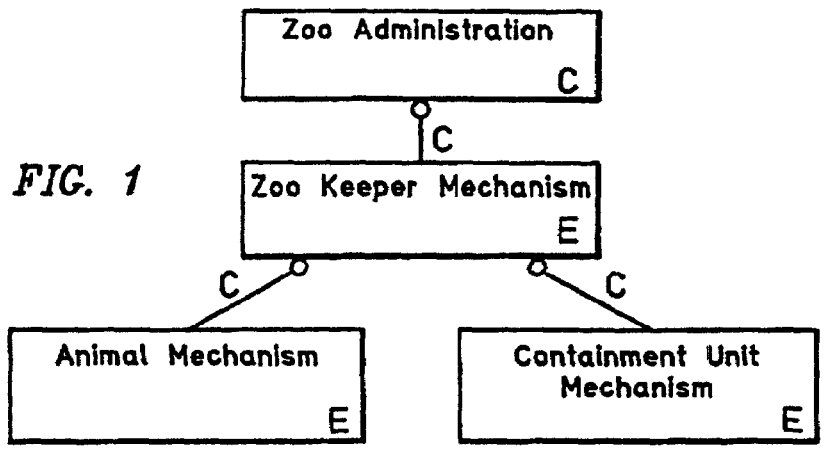
FIG. 1 is a category diagram of an exemplary Zoo Administration framework that illustrates the principles implemented by the system of the present invention.

The present invention was developed using Object-Oriented (OO) framework technology. The preferred embodiment is implemented in an object oriented programming environment. Therefore, an exemplary OO system will be described next. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technologies (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Stated another way, OO technology is significantly different from procedural technology because problems are broken down into sets of cooperating objects instead of into hierarchies of nested computer programs or procedures. That is, procedural technology defines a system in terms of data variables and process functions whereas OO technology defines a system in terms of objects and classes.

The Term "Framework"

There has been an evolution of terms and phrases which halve particular meaning to those skilled in the art of OO design. However, the reader should note that one of the most loose definitions in the OO art is the definition of the word "framework." The word framework means different things to different people. Therefore, when comparing the characteristics of two supposed OO frameworks, the reader should take care to ensure that the comparison is indeed one of "apples to apples." As will become more clear in the forthcoming paragraphs, the term framework is used in this specification to describe an OO technology system that has been designed to have core function and extensible function. The core function is that part of the framework that is not subject to modification by the framework purchaser. The extensible function, on the other hand, is that part of the framework that has been explicitly designed to be customized and extended by the framework purchaser as part of its implementation.

OO Framework

While in general terms an OO framework can be properly characterized as a type of OO solution to a programming problem, there is nevertheless a fundamental difference between a framework and a basic OO programming solution. The difference is that frameworks are designed in a way that permits and promotes customization and extension of certain aspects of the OO solution, whereas a basic OO solution can be said to comprise a particular collection, or library, of classes and objects. In other words, frameworks provide an OO programming solution that can be customized and extended to address individualized requirements that change over time. Of course, the customization/extension quality of frameworks is extremely valuable to purchasers (referred to herein as framework consumers) because the cost of customizing or extending a framework is much less than the cost of replacing or reworking an existing program solution.

Therefore, when framework designers set out to solve a particular problem, they should do more than merely design individual objects and specify how those objects interrelate. They should also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework rests not only on the quality of the object design, but also on the design choices involving which aspects of the framework represent core function and which aspects represent extensible function.

ZAF—An Illustrative Framework

While those skilled in the art appreciate that framework design is necessarily an intertwined and iterative process, example design choices for a simplistic framework are set forth in the paragraphs that follow. It should be understood, though, that this is only an example framework that is being used in this specification to illustrate and best explain frameworks such that the reader can better understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for the illustrative framework is that of zoo administration. The specific problem presented is that of designing a framework that assists zoo keepers in the care and feeding of zoo animals. In the example, which will be referred to as a Zoo Administration Framework (ZAF), an OO framework designer would look to the zoological problem domain and decide that any ZAF would of necessity involve an abstraction that represents the relationship between zoo keepers and animals (i.e., represents how zoo keepers care for animals). The framework designer would also likely recognize that zoo animals usually live in cages, pens, tanks, and other sorts of containment units. Therefore, the framework designer also would start with the idea that the framework would have to involve abstractions or mechanisms that represent all of these fundamental entities and relationships.

How ZAF is Designed

To begin the design process, the framework designer would likely begin with what is called a category diagram. Category diagrams are used to describe frameworks at a high level and to define how the framework components relate to one another. FIG. 1 is a category diagram for the example framework ZAF. The notation used in FIG. 1, and that used in the other figures of this specification, is explained in detail in the Notation section at the end of this portion of the specification. Each entity, or icon, in a category diagram represents groupings of data objects that perform a particular function. For the purposes of illustration, assume that the framework designer decides that ZAF should be made up of four components that, at a high level perspective, will be referred to as mechanisms: a Zoo Administration mechanism, a Zoo Keeper mechanism, an Animal mechanism, and a Containment Unit mechanism.

As shown in FIG. 1, the Zoo Administration mechanism has been designed to use the Zoo Keeper mechanism to administer the zoo. The Zoo Administration mechanism is therefore said to have a "using" relationship with the Zoo Keeper mechanism. (Again, please refer to the notation section of this specification for an explanation of this relationship and the other notation used in this specification.)

As discussed above, the Zoo Administration mechanism has been designed to have responsibility for overall control of ZAF. Accordingly, the Zoo Administration mechanism is responsible for scheduling the operation of the Zoo Keeper mechanism. Note also that the framework designer has designed the Zoo Administration mechanism to be a core function of ZAF, which means that it has been designed such that it will not be subject to potential customization and extension. The upper case block letter "C" in the category box for the Zoo Administration mechanism denotes this fact. Note further that the "uses" relationship between the Zoo Administration mechanism and the Zoo Keeper mechanism also has been designed as a core function such that it is not available for ultimate customization by the framework consumer.

The Zoo Keeper mechanism has been designed to be generally responsible for the care and feeding of the zoo animals. Accordingly, it uses the Animal and Containment Unit mechanisms to perform its tasks. Unlike the design of the Zoo Administration mechanism, however, the framework designer has designed the Zoo Keeper mechanism to be an extensible function, which again means that the Zoo Keeper mechanism has been designed to be available for modification and/or extension by the framework consumer to address future care and feeding requirements. This fact is denoted by the upper case block letter "E" in the Zoo Keeper mechanism category box.

The framework designer has designed the Animal mechanism to represent the animal side of the interaction between zoo animals and zoo keepers. Since the animal population in the zoo is something that changes on a regular basis, the Animal mechanism has similarly been designed as an extensible function. The Containment Unit mechanism interacts with the Zoo Keeper mechanism by representing individual containment units such as pens, tanks, and cages. Like the Animal mechanism, the Containment Unit mechanism has been designed as an extensible function such that it can handle future customization and extension requirements. Please note here, however, that even though the Zoo Keeper, Animal, and Containment Unit mechanisms have all been designed as extensible functions, the relationships between the mechanisms have been designed to be a core function of ZAF. In other words, even though it is desirable to give ZAF's consumers flexibility relative to the Zoo Keeper, Animal, and Containment Unit mechanisms, it is not desirable to allow ZAF's consumers to change how these mechanisms relate to one another.

The framework designer next designs the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2:
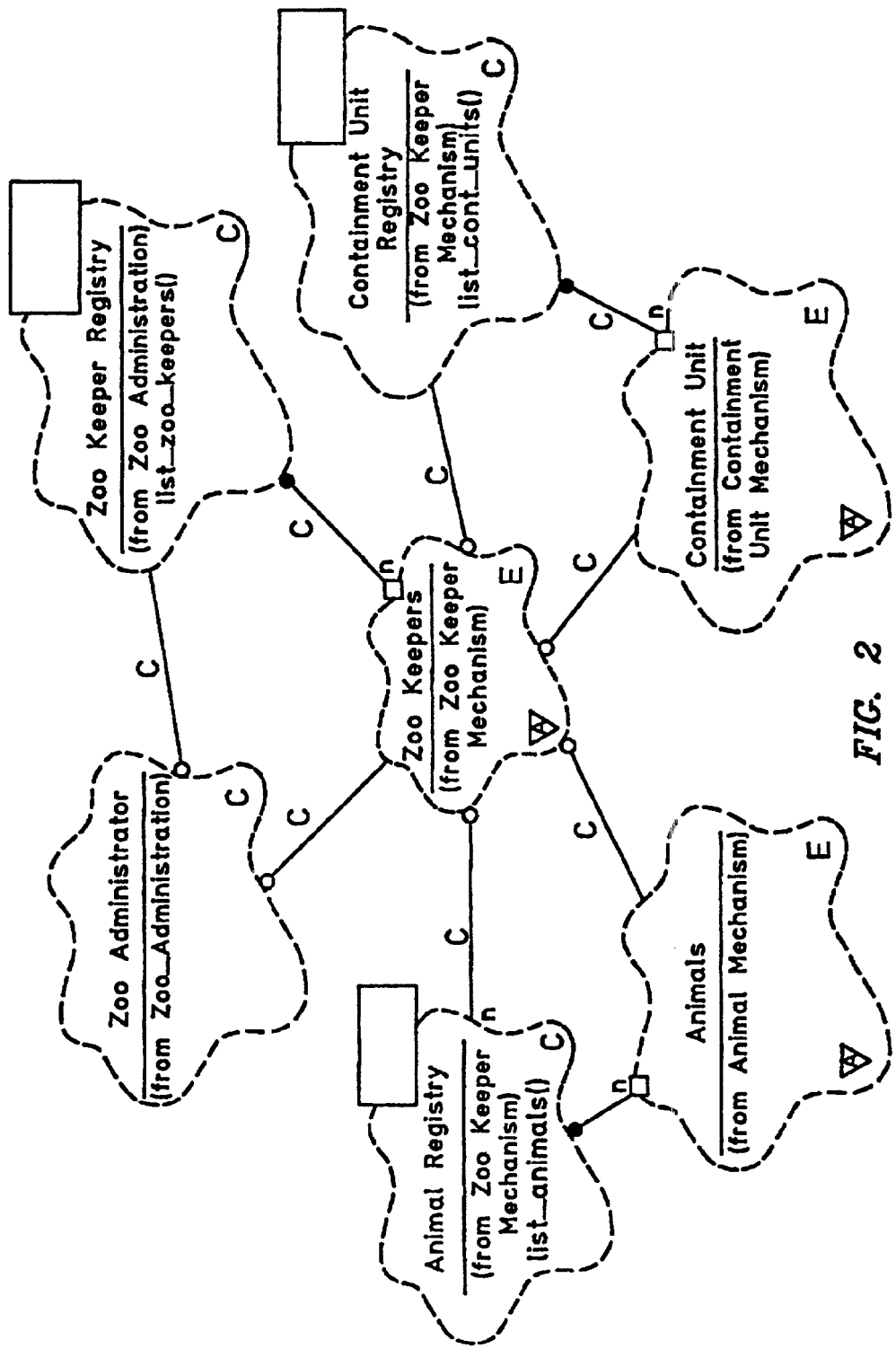

FIG. 2 is an OO class diagram that shows the fundamental classes that the framework designer has designed for ZAF. Each class representation indicates its relationship to the mechanisms shown on FIG. 1. For example, the Zoo Keepers class is denoted as being from the Zoo Keeper mechanism. The fundamental classes of ZAF include: the Zoo Administrator class, which is part of the Zoo Administration mechanism; the Zoo Keeper Registry class, which is also part of the Zoo Administration mechanism; the Animal Registry class, which is part of the Zoo Keeper mechanism; the Zoo Keepers class, which is also part of the Zoo Keeper mechanism; the Containment Unit Registry class, which is also part of the Zoo Keeper mechanism; the Animals class, which is part of the Animal mechanism; and the Containment Unit class, which is part of the Containment Unit mechanism. It should be noted that the relationships between the classes have been designed as core functions of ZAF such that they are not available for ultimate modification by ZAF's consumers.

The Zoo Administrator class is the definition of the object that is responsible for the overall control of ZAF. Again, OO classes only define the objects that interact to provide a solution to the problem. However, it is by exploring the characteristics of the class definitions that one is able to understand how the objects of the framework mechanism have been designed to provide a living solution that can be customized and/or extended to address future requirements.

The Zoo Administration class has been designed to have a "uses" relationship with the Zoo Keeper Registry class. The framework designer has designed the Zoo Administration and Zoo Registry classes to be a core function of ZAF because the designer has decided that ZAF's consumers should not be allowed to modify the behavior of objects that are members of these class definitions. The Zoo Keeper Registry, which has what is called a "contains by reference" relationship with the Zoo Keepers class, is simply a class that defines an object that is a container for all zoo keeper objects. Accordingly, the Zoo Keeper Registry includes a definition for a list_zoo_keepers( ) operation. As will be described later, this operation is responsible for providing a list of Zoo Keepers objects to other objects that request such a list.

Figure 3:
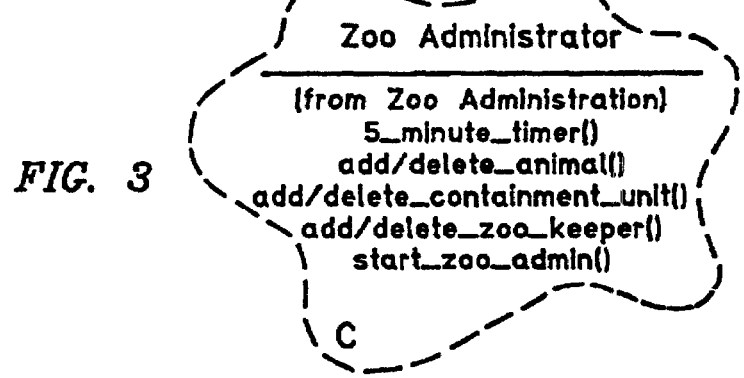
FIGS. 2, 3, 4, 5, and 6 are class diagrams for the exemplary, Zoo Administration framework of FIG. 1.

FIG. 3 shows a lower level view of the Zoo Administrator class. Because objects of type zoo administrator have responsibility for overall control of ZAF, the Zoo Administrator class has been designed to include operations that perform tasks oriented towards zoo administration. The class definition includes the following five operations: 5_minute_timer( ), add/delete_animal( ), add/delete_containment_unit( ), add/delete_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. The start_zoo_admin( ) operation has been designed to initiate the 5_minute_timer( ) operation such that, every five minutes, the 5_minute_timer( ) operation instructs the Zoo Keepers objects to go out and check on the zoo animals. The add/delete_zoo_keeper( ) operation is responsible for interacting with users of ZAF to define additional zoo keepers (i.e., additional Zoo Keepers classes), to add additional zoo keepers (i.e., Zoo Keepers objects), and to remove Zoo Keeper classes and/or objects. As will become clear in the forthcoming paragraphs, each of the Zoo Keepers objects is responsible for performing a particular zoo task. Therefore, it is natural that a user of ZAF might well want to add a Zoo Keepers definition and object to handle an additional zoo task or to remove a definition or object that is no longer needed. The ZAF framework designer has provided this flexibility by designing the Zoo Keeper mechanism as an extensible function.

Like the add/delete_zoo_keeper( ) operation, the add/delete_animal( ) operation is responsible for interacting with users to define additional zoo animal classes and objects and also to remove classes and objects that are no longer needed. Again, it is quite natural for a zoo to need to add and remove animals. The add/delete_containment_unit( ) operation is responsible for the definition of new Containment Unit classes and objects and for removal of classes and/or objects that are no longer necessary. Again, the framework designer has provided such flexibility by designing the Animal and Containment Unit mechanisms as extensible functions.

Referring back to FIG. 2, the Zoo Keepers class definition has a "uses" relationship with the Animal Registry, Animals, Containment Unit Registry, and Containment Unit classes. Since the value of ZAF is enhanced by allowing ZAF's consumers to customize and extend the Zoo Keepers, Animals, and Containment Unit classes, the ZAF framework designer has designed these classes as extensible functions. However, changing the behavior of the Animals and Containment Unit Registry classes would disrupt the basic operation of ZAF. Therefore, the framework designer has designed these classes to be core functions of ZAF.

Figure 4:
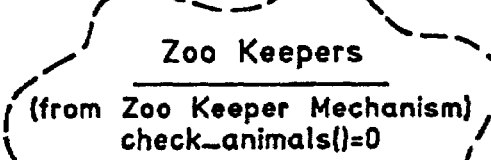
Figure 4:
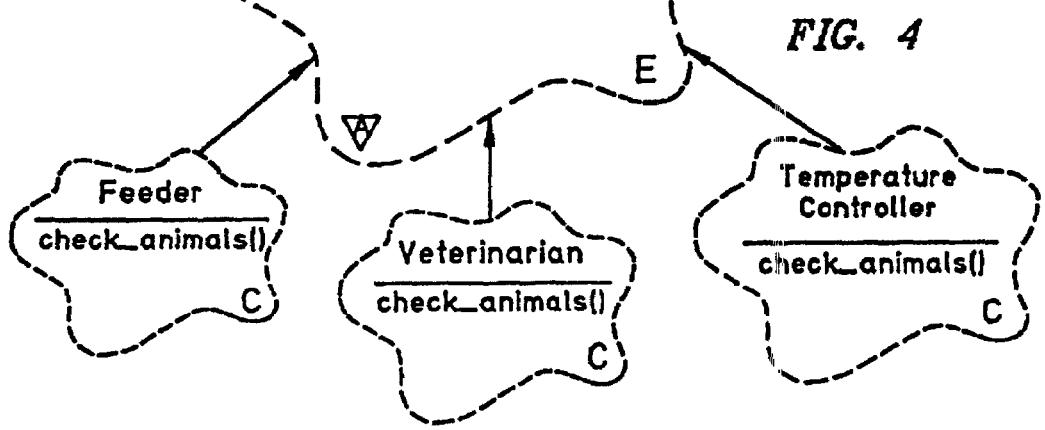

FIG. 4 is a class diagram of the Zoo Keepers class. However, before describing the details of FIG. 4, it is worthwhile to point out that the class definitions shown on FIG. 4 are ranked in a very simple ordering called a class hierarchy. A class, like the Zoo Keepers class, that represents the most generalized/abstract class in a class hierarchy is referred to as the base class of the hierarchy. The ordering of classes in a class hierarchy goes from most general to least general (i.e., from general to specific). Less general classes (e.g., the Feeder class) are said to inherit characteristics from the more general class or classes (i.e., the Zoo Keepers class in this case). As such, class definitions Feeder, Veterinarian, and Temperature Controller are said to be subclasses of the Zoo Keepers class. Inheritance mechanisms will be explored in more detail in the discussion associated with FIG. 5.

As shown on FIG. 4, the Zoo Keepers class definition contains a single operation definition, the check_animals( ) operation definition. The reader should also note that the Zoo Keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the Zoo Keepers class definition, the Feeder, Veterinarian, and Temperature Controller subclasses define specific implementations of the pure virtual check_animals( ) operation definition that is contained in the Zoo Keepers class. An operation is marked as a pure virtual operation when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the Zoo Administrator class needs a particular action performed, it interacts with a Zoo Keepers object. Because the interface to these objects was defined in abstract, base class Zoo Keepers and preserved in the subclass definitions for the check_animals( ) operation, the Zoo Administrator object need not have special knowledge about the subclasses of any of the server objects. This has the effect of decoupling the need for the action (i.e., on the part of the zoo administrator object) from the way in which the action is carried out (i.e., by one of the objects of the Zoo Keepers subclasses). Designs (such as the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact that the action is actually performed. In other words, client objects need only understand that certain objects perform certain functions, not how those functions are actually carried out. This is one way in which a properly designed OO framework can be readily customized and extended to satisfy future requirements.

Figures 5, 6:
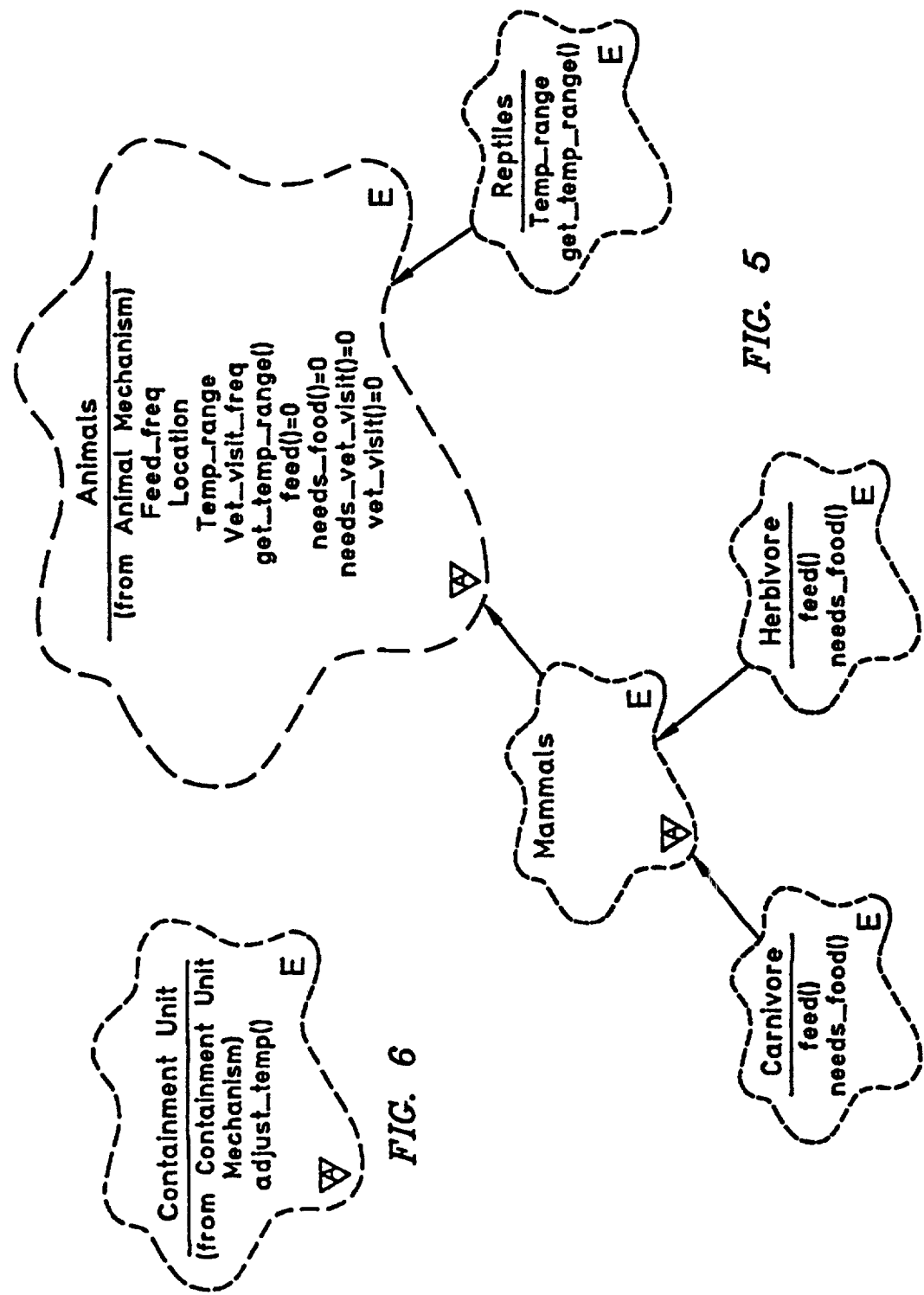

As previously discussed, the framework designer has designed the ZAF framework such that Zoo Keepers objects interact with Animals and Containment Unit objects to perform their respective tasks. FIG. 5 is a class diagram for the class hierarchy of the abstract class Animals. Because the Animals class definition is responsible for representing the characteristics and behavior of zoo animals, the framework designer has designed the abstract class Animals in a way that reflects this responsibility. As shown, the example class definition for Animals includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus, which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In the ZAF framework, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

FIG. 5 shows that Mammals is a subclass of the class Animals and, as such, the Mammals class inherits all of the characteristics of the Animals class. The Mammals class is also designed as an abstract class, which again means that it has not been designed to have objects created as its members, but has instead been designed to provide a common interface for its subclasses. Subclass Mammals is further subclassed into classes Carnivore and Herbivore.

Because definition of the feed( ) operation has been left up to the subclasses, the subclasses Carnivore and Herbivore each have their own definition of the feed( ) operation. Again, this is a good design choice because meat-eating carnivores are going to have different needs than their plant-eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass Reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the Reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the Containment Unit class. The containment unit class contains a virtual operation definition adjust_temp( ). The adjust_temp( ) definition defines both the interface and mechanism used to actually adjust the temperature in the containment units of the zoo (i.e., via heating and cooling mechanisms that are not shown).

How the ZAF Objects Interact

Beyond designing the objects that make up the solution to the specific programming problem, the framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that second object. One of the operations of the called second object (i.e., a server operation in this case) is then executed to access and/or manipulate the data controlled by the called object.

Figure 7:
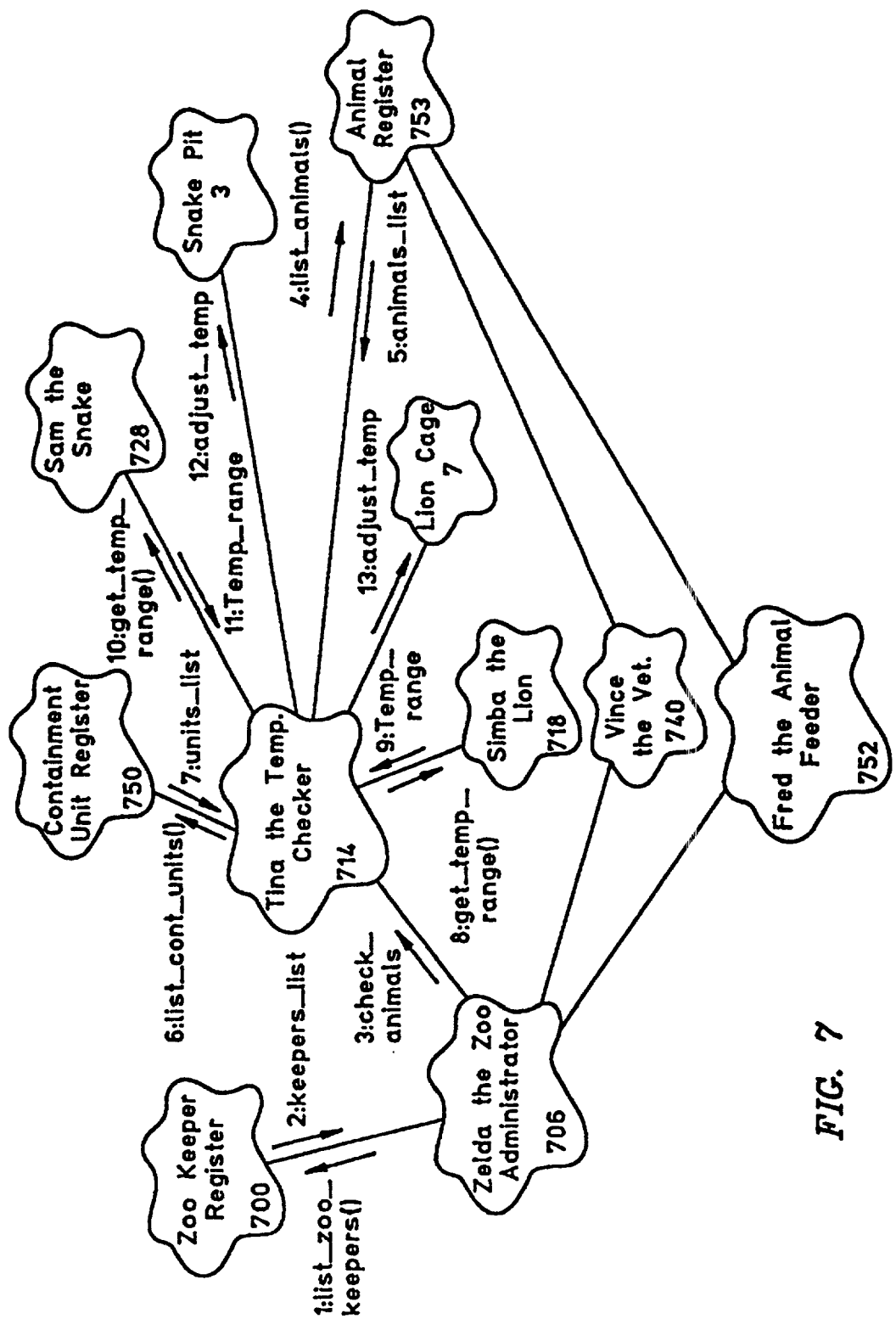
FIG. 7 is an object diagram for the exemplary framework of FIGS. 1 through 6.

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects in an OO environment interact to solve problems.

As mentioned, an object is created to be a member of a particular class. Therefore, the object Zelda the Zoo Administrator 706 is an object that is a member (actually, the only member) of the Zoo Administrator class. As such, object Zelda is responsible for overall control of ZAF. All of the Zoo Keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object 700 has been created as a member of the Zoo Keeper Register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the Zoo Keepers class. In particular, objects Tina the Temp. Checker, Vince the Vet., and Fred the Feeder are respectively members of the Temperature Controller, Veterinarian, and Feeder subclasses.

Once the list of current zoo keepers has been returned to object Zelda 706, object Zelda instructs each zoo keeper in the list to check the animals by calling the check_animals( ) operation of each Zoo Keeper object. Only the call to Tina the Temp. Checker is shown, indicated as step 3. It should be noted that object Zelda did not need to understand the types of zoo keepers that were in the zoo keeper list, the number of Zoo Keeper objects in the list, or the specialized characteristics of any one Zoo Keeper object. Object Zelda uses the same interface (i.e., the check_animals( ) operation) to communicate with each Zoo Keeper object. It is then up to the individual Zoo Keeper objects to perform the task for which they have been created. Each Zoo Keeper object performs its assigned task through use of its own check_animals( ) operation. For example, object Tina's check_animals( ) operation retrieves a list of current animals from the Animal Registry object by calling the list_animals( ) operation [step 4] and then a list of containment units from the Containment Unit Register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina 714 does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF system is an extremely simplistic framework that has been presented to help novice readers understand some basic framework concepts so as to better appreciate the benefits and advantages of the present invention. These benefits and advantages will become more clear upon reference to the following Detailed Description.

The Computer System of the Preferred Embodiment

Figure 8:
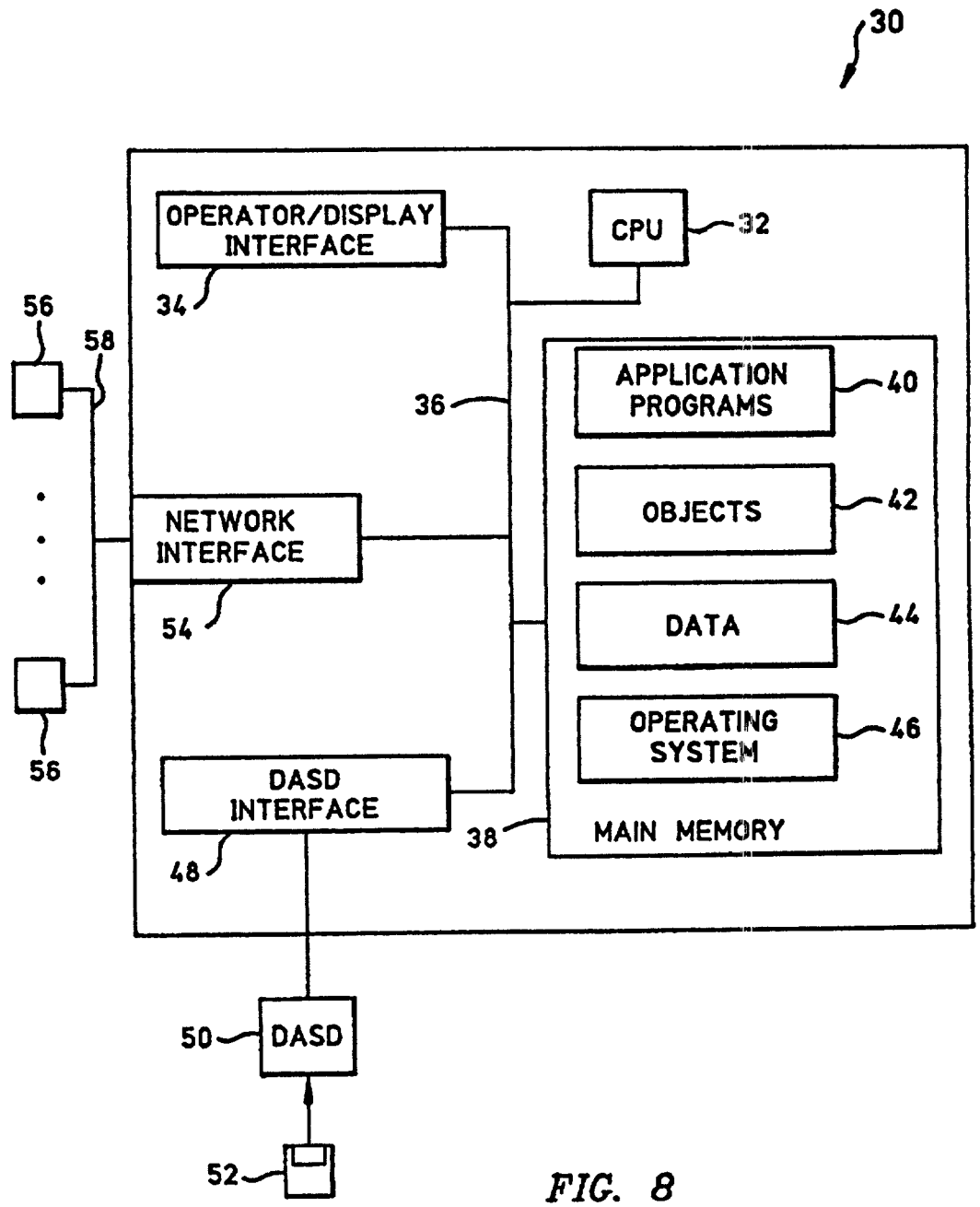
FIG. 8 is a functional block diagram of a computer processing system constructed in accordance with the present invention to perform information retrieval processing.

FIG. 8 is a block diagram of a computer system 30 constructed in accordance with the present invention. The computer system includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read computer program products 52 comprising, for example, memory integrated circuit chips and also machine-readable storage devices such as magnetic media disks, on which are recorded program instructions whose execution implements the framework of the present invention. The machine-readable storage devices also can comprise, for example, media such as optical disks. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

It is important to note that, while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable-type media such as floppy disks and CD ROMS and transmission-type media such as digital and analog communication links.

System Processing

Start-Up Processing Steps

Figure 9:
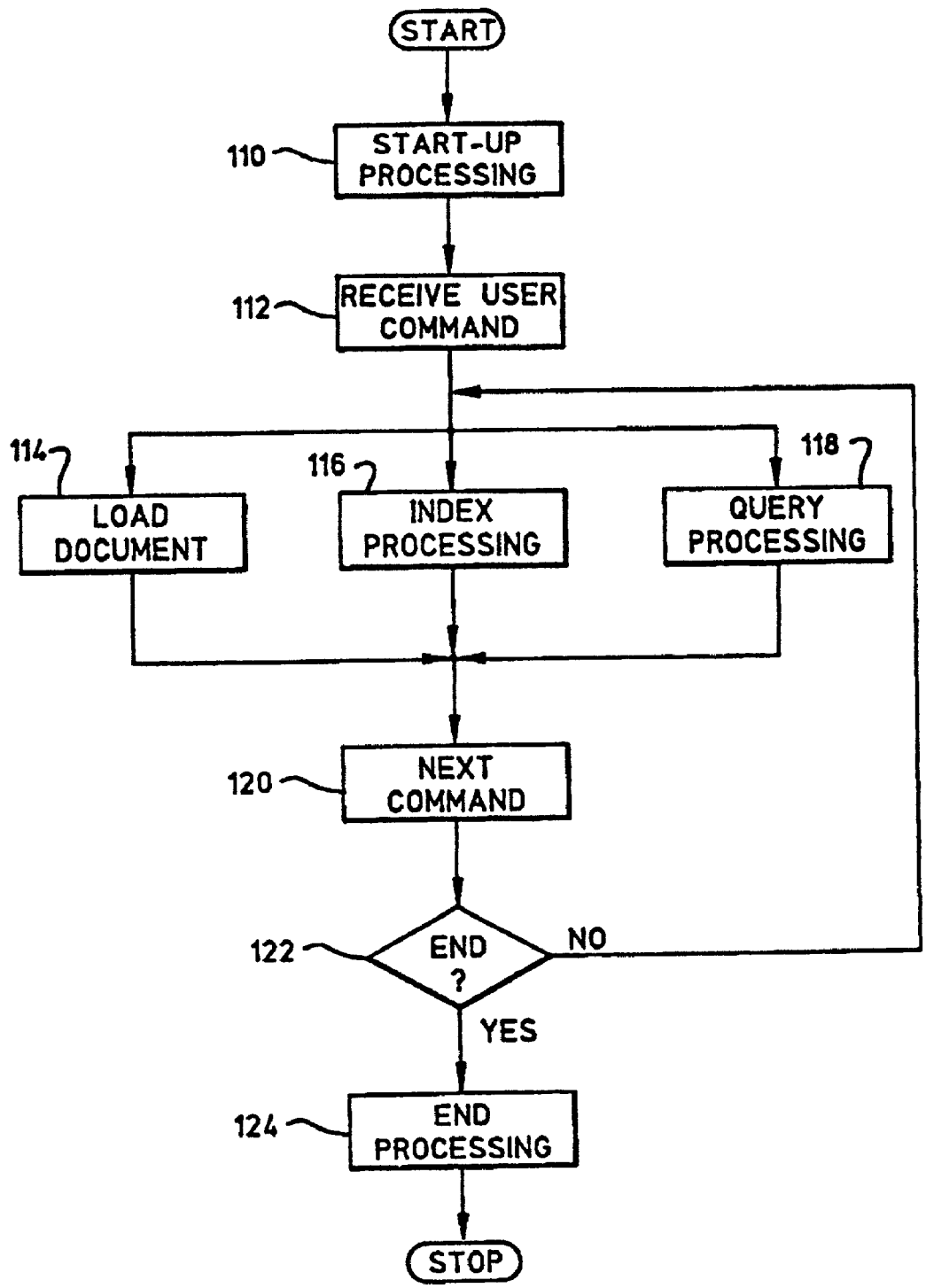
FIG. 9 is a flow diagram that illustrates the operations performed by the framework mechanism of the computer processing system illustrated in FIG. 8.

FIG. 9 is a flow diagram that represents a typical sequence of processing steps executed by the computer system illustrated in FIG. 8 in processing user commands that request either load document, build index, or query result processing following Information Retrieval (IR) system generation and start-up processing.

The first step of processing is represented by the flow diagram box numbered 110, which indicates start-up processing. The start-up processing comprises operations such as providing an object oriented programming environment within which the necessary object data structures are maintained. The next processing step, represented by the flow diagram box numbered 112, is for the system to receive a user command that selects one of three Information Retrieval functions.

The IR functions comprise load document, build index, or query result processing. The query result processing compares documents that are indexed in a data base against a received user query. Documents that are relevant to the query are presented to the user for selection and retrieval. The build index processing generates index information that is used for efficient evaluation of the user query. Finally, before a document can be indexed it must be loaded and subjected to initial system processing, described further below.

After the IR system user command is received, it is carried out. The operations of determining what processing is necessary in accordance with the received IR system command are represented by the flow diagram boxes numbered 114, 116, and 118. If the IR command was for load document processing, then the operations represented by the flow diagram box numbered 114 are performed. If the IR system command was for build index processing, then the operations represented by the flow diagram box numbered 116 are performed. If the IR system command was for query result processing, then the operations represented by the flow diagram box numbered 118 are performed.

After the IR system command is performed, the system receives a next IR system command, as represented by the flow diagram box numbered 120. If the command calls for an end of processing, an affirmative outcome at the decision box numbered 122, then the IR system processing continues with end processing. The end processing is represented by the flow diagram box numbered 124 and includes, for example, destructor operations that delete object data structures instantiated by the computer system upon execution of the start-up processing, in accordance with object oriented programming principles. The end processing also can include a garbage collection processing operation in which documents deleted from the data storage are detected and deleted from the information retrieval system data structures. Such processing is described in greater detail below. Other end processing operations relating to the termination of the object oriented programming environment will be known to those skilled in the art without further explanation.

If the next IR system command received at the flow diagram box numbered 120 does not call for end processing, a negative outcome at the decision box numbered 122, then the system processing continues with either load document, build index, or query result processing at the appropriate flow diagram boxes 114, 116, or 118, respectively. Thus, the three operations of load document, build index, and query result can be repeated for as long as the user desires IR processing.

Load Document Processing

Figures 10, 11:
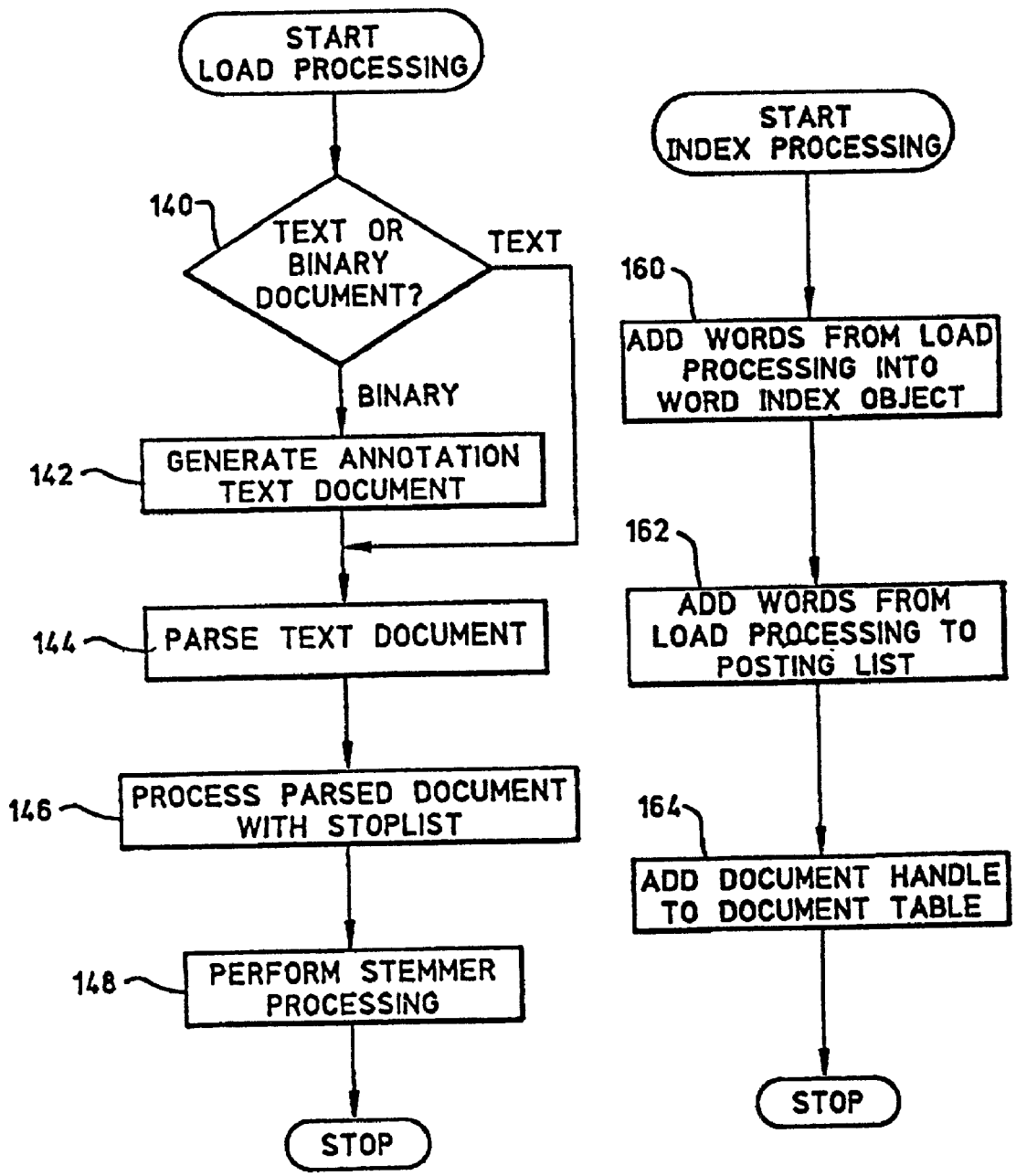
FIG. 10 is a flow diagram that illustrates the operations performed by the computer processing system illustrated in FIG. 8 in performing load document processing.
FIG. 11 is a flow diagram that illustrates the operations performed by the computer processing system illustrated in FIG. 8 in performing build index processing.

FIG. 10 is a flow diagram that represents the operations executed by the computer system illustrated in FIG. 8 in performing the load document processing of the FIG. 9 flow diagram box numbered 114. The load document processing is the means by which the user adds to the information base from which the information retrieval processing will be carried out. Each of the documents that can be loaded into this data base comprise what is generally referred to as a binary large object, or BLOB. The BLOB can comprise a text document (typically represented in the computer system according to a text processing format or the well-known ASCII representation scheme), a video image, a digital audio image, or some other form of digitized image data.

In the first step of load document processing, represented by the flow diagram box numbered 140, the system determines if the document to be loaded is a text document or a generalized binary document. In the preferred embodiment, the documents of the data base comprise BLOB objects that are members of the Document class, having attributes of data bits with subtypes of Text documents and Binary documents. That is, video, audio, and image data objects are types of Binary documents. The information queries received from the system user are posited in the form of text-based inquiries. Therefore, each document loaded into the system data base must be associated with a text document, even if the document itself comprises video, audio, or image data.

In the document type determining step of decision box 140, if the document is a binary document, then the system generates an annotation document. The annotation document comprises text that characterizes the binary document and that the system can compare against a text-based query received from the system user to determine relevance. For example, an annotation document generated for a binary image document showing a lake with mountains in the distance might comprise text that contains words providing such a description ("lake, mountains, sky"). The annotation document thereafter could be searched against queries and, for example, might be retrieved by a user that provides a query asking for images with subject matter related to mountains or lakes.

The text for the annotation document can be provided by the user, as where the user produces a synopsis of the binary document, or the system can automatically generate the annotation document. One example of minimal automatic generation of an annotation document would be an annotation that comprises the document title (file name) of the binary document. This would permit direct retrieval of documents if the file name of a binary document were known.

It should be apparent that a document consisting of text needs no annotation document. That is, if the document to be loaded comprises text, then there is no need to generate a separate annotation document to provide text against which a query can be compared. Therefore, if the outcome of the decision box numbered 140 indicates that a document is a text document, the system processing bypasses the operations represented by the flow diagram box numbered 142 that relate to the annotation document.

After text is associated with a document, the text (either the text document itself or the annotation text document associated with a video, audio, or image document) is parsed. The parsing operation is represented in FIG. 10 by the flow diagram box numbered 144. The parsing operation receives the text (comprising a stream of characters and spaces) and parses it into words for later comparison against the user query. The parsing operations include appropriate handling of special characters, punctuation, numerals, and the like.

After parsing, the resulting document is processed with a stoplist. The stoplist processing checks each word in the parsed document for membership in a stoplist collection of words that are poor index words because they are common words that convey little or no substantive information. Thus, stoplist words do not contain sufficient information to be useful in providing a query result. Examples of stoplist words in the English language are conjunctions ("and", "or") and prepositions ("the", "it"). The stoplist processing improves the retrieval performance by eliminating relatively unimportant words and reduces the size of the information that must be compared against the query. The stoplist processing operations are represented by the flow diagram box numbered 146.

After parsing and stoplist processing, the document undergoes conflation, also referred to as stemming, which is represented by the flow diagram box numbered 148. The stemming operation maps words with common stems into that stem. For example, the words "compute", "computes", "computer", "computation", and "computational" might all be mapped into the stem "comput" by the stemmer processing. It should be noted that the stem into which words are mapped is not necessarily a defined word (such as "comput" in the example). As with stoplist processing, the stemmer processing improves query response processing and reduces the information size. Preferably, the IR system developer selects stems based on knowledge of the type of information to be processed, to supplement a standard default stem library.

The operations of parsing, stoplist processing, and stemming represent the basic text preprocessing functions performed by the IR system before the next step of indexing is performed. Additional text preprocessing functions can be added, if desired. For example, thesaurus processing might be performed to further reduce the size of the information in the data base (or might be performed to increase the number of words used to characterize a document).

Build Index Processing

FIG. 11 is a flow diagram that represents the operations executed by the computer system illustrated in FIG. 8 in performing the build index processing of the FIG. 9 flow diagram box numbered 116.

Upon completion of the text preprocessing illustrated in FIG. 10, a document is loaded in the data base and then can be indexed. Index processing updates a word index, posting lists, and a document table. An entry in the word index points to a posting list, and each posting list entry points to an entry in the document table.

In the first processing step of build index processing, words located during the load processing operation are added into the word index. This processing is represented by the FIG. 11 flow diagram box numbered 160. The word index contains parsed and stemmed document words.

The word index entries point to posting list entries. After the word index is updated with the words from load processing, the next step is to update the posting list, as represented by the flow diagram box numbered 162. The posting list is a data structure that contains a list of documents and corresponding word stem counts, showing the number of times a word stem appears in a document. For example, the first document in the posting list might include the words "compute" and "computational", both formatives of the word stem "comput". The word count for both words will be included within a single count entry for the stem "comput". The second document might also include "comput" formatives, but might have a different frequency count. The third document in the posting list might not include any words that are "comput" formatives. In this way, the posting list indicates the number of times words appear in a document.

The posting list entries point to document handles found in the document table. The next build index operation, represented by the flow diagram box numbered 164, is to update the document table. The document table provides a mapping between a document handle and an actual document. Preferably, the document handles in the posting list comprise sequential numbers that relate to the documents. Thus, the posting list will contain entries indexed by document 1, document 2, document 3, and so forth. Corresponding entries in the document table then point to the actual storage locations where the document can be found. Thus, the first entry in the document table contains a pointer to the storage locations for document 1, the second entry in the document table points to document 2, the third entry points to document 3, and so forth.

The document table reduces the size of the posting list and permits quick deletion of documents from the data base. For example, the document table permits a quick deletion (or "lazy deletion") operation in which a user can mark a document table entry as deleted, and thereafter that document will be excluded from retrieved query results. This eliminates the need for deletion processing to go through the posting list to pick out the deleted documents at the time of lazy deletion. Rather, at a later time, such as during a garbage collection mode, the documents marked as deleted from the document table can be determined, and can be deleted from the posting list. This "lazy deletion" speeds up information retrieval processing.

Query Result Processing

Figure 12:
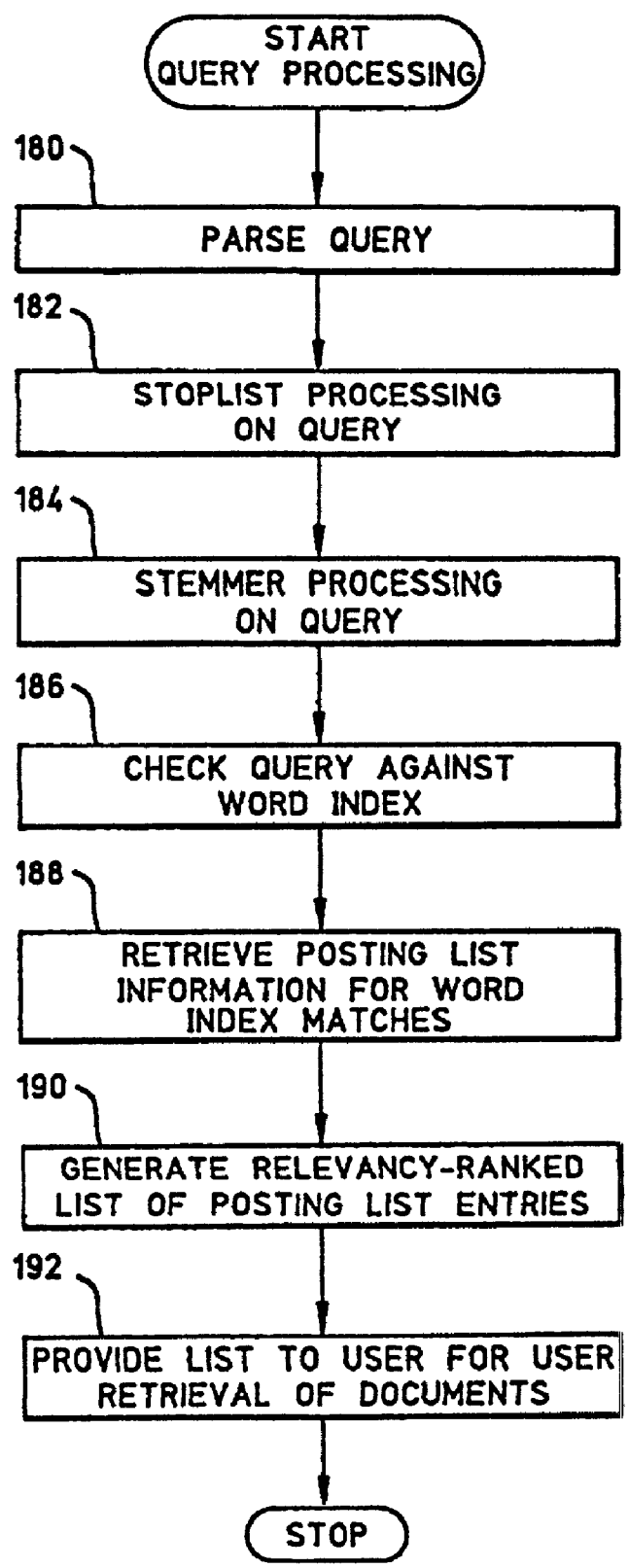
FIG. 12 is a flow diagram that illustrates the operations performed by the computer processing system illustrated in FIG. 8 in performing query processing.

FIG. 12 is a flow diagram that represents the operations executed by the computer system illustrated in FIG. 8 in performing the query result processing of the FIG. 9 flow diagram box numbered 118.

An information retrieval system user can input a query and the system will locate the documents containing relevant subject matter. Such processing is illustrated in FIG. 12. A query is parsed, stoplist processed, and stemmed just as a document in the text preprocessing. Therefore, the first step of query processing represented in FIG. 12 by the flow diagram box numbered 180 is to parse the query. Next, the query is processed with the stoplist, as represented by the flow diagram box numbered 182. The step is represented by the flow diagram box numbered 184, which indicates that the query is processed with the stemmer.

After the user query has been parsed, stoplist checked, and stemmed, it can be evaluated against the word index. This processing is represented by the FIG. 12 flow diagram box numbered 186 and comprises finding matches between the stems of the user query and the stems of the word index. Based on the word index matches, the IR system next retrieves the posting list information for the matched stems. This processing is represented by the flow diagram box numbered 188. Next, as represented by the flow diagram box numbered 190, the IR system generates a list of the retrieved posting list entries ranked in order of occurrence frequency. For example, if the user query involved the "comput" stem, and if Document 1 in the posting list included a "comput" stem formative with a frequency count of four occurrences, and Document 2 included a "comput" stem formative with a frequency count of eight occurrence s, then the list of retrieved posting list entries would list Document 2 first and Document 1 next, The document titles corresponding to the document handles are presented to the IR system user in their ranked ordering, as indicated by the flow diagram box numbered 192. The user then can retrieve the documents, if desired. As noted above, the posting list entries point to the document table. Thus, a user would receive a list having document handles from the posting list for documents with query matches, such as Document 2, Document 1, Document 12, and so forth, and the user can select one or more documents for retrieval. In response to a user selection of a document handle, the IR system will go to the corresponding storage location specified by the document table and permit the user to view the document according to the computer system operation procedures.

The Object Oriented Implementation of the Preferred Embodiment

The present invention provides an object oriented framework. The operation of the IR system developed using the framework can be understood with reference to the procedural flow diagrams of FIGS. 9, 10, 11, and 12. Persons skilled in the art, however, will appreciate that the framework objects, their relationships, and their processing also can be precisely and completely described in terms of object oriented programming representations. Therefore, the framework of the preferred embodiment will next be described in terms of category diagrams and object diagrams similar to those described above in conjunction with FIGS. 1 through 7 for the zoo keeper example.

Figure 13:
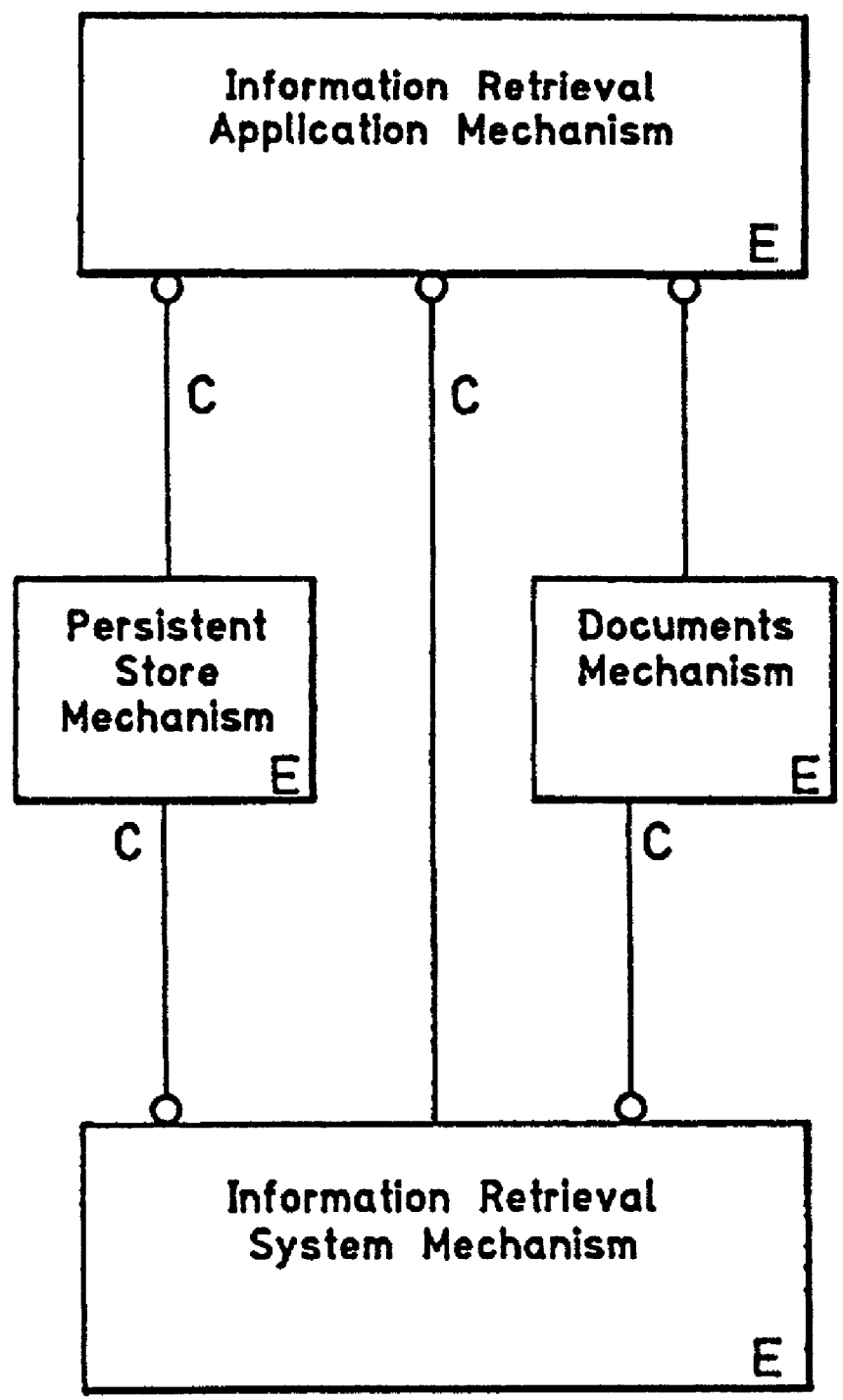
FIG. 13 is a category diagram representation of the framework mechanism of the computer processing system illustrated in FIG. 8.

FIG. 13 is a category diagram for the framework implemented in the computer system of FIG. 8. Those skilled in the art will appreciate that the categories illustrated in FIG. 13 correspond to object oriented programming (OOP) objects that encapsulate data attributes and behaviors, and are stored in the memory 38 illustrated in the block diagram of FIG. 8. Such objects can be implemented, for example, in a computer system operating environment that supports the C++ programming language.

FIG. 13 shows that the framework includes four primary components, or mechanisms, that are indicated as being "extensible" mechanisms and therefore can be changed with the framework extensions implemented by the framework user, who is the Information Retrieval (IR) system provider. The mechanisms are shown as comprising an Information Retrieval Application mechanism, a Persistent Store mechanism, a Documents mechanism, and an Information Retrieval System mechanism. The extensible character of the mechanism categories is indicated by the "E" within each category box in FIG. 13.

The Information Retrieval System mechanism provides the main user interface between the extended IR system and the system user. Thus, it receives commands from the system user and carries out the appropriate operations. The Information Retrieval Information Application mechanism is the main application interface for the various applications that need information retrieval support. These applications include applications that perform the document loading, index building, and query processing. Thus, the applications will communicate with the Information Retrieval Application mechanism to modify the text processing documents, process the user query, and retrieve the documents.

The Documents mechanism contains binary large objects (BLOBs), which are uninterpreted streams of bits. The BLOBs are preferably different types of object oriented data structures that include video, audio, and image documents, as well as text documents. BLOBs that are not text documents are classified as binary documents and are associated with corresponding annotation text documents used for indexing, as described above. The dual object representation provides enhanced performance because there is no need to retrieve the entire document during searching.

The Persistent Store mechanism can comprise either an object oriented data base or can be a conventional file system. The object oriented implementation, however, provides benefits such as transaction capability and document attribute query, both of which permit greater versatility for the resulting IR system.

The relationships between these object oriented mechanism categories are illustrated as "core" relationships that do not change with framework extensions. Thus, the object classes, their attributes, and the ways in which they interact with each other, will not change. The core relationships are indicated by the "C" along the connecting lines between the mechanism category boxes. The open circle on each connecting line indicates a "has" relationship from the box with the circle to the box without the circle.

Information Retrieval Interface Class

Figure 14:
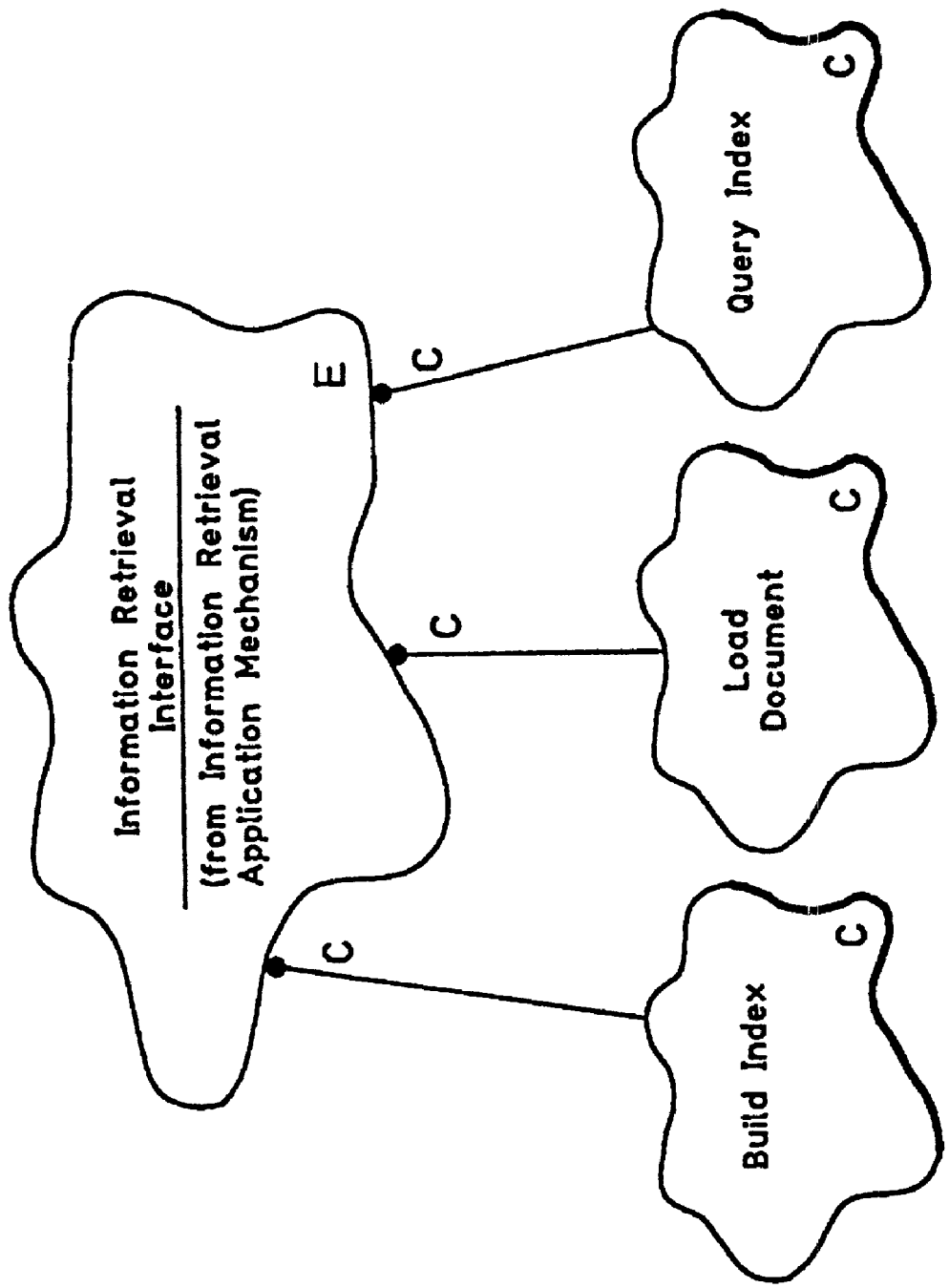
FIG. 14 is a class diagram representation of the Information Retrieval Interface category implemented by the computer processing system illustrated in FIG. 8.

FIG. 14 is a class diagram that illustrates the characteristics of the class called InformationRetrievalInterface (in the following description, the object class names will be represented as initial-uppercase-letter words that are run together). Each use of the framework causes instantiation of an InformationRetrievalInterface object. The class cloud for InformationRetrievalInterface indicates that it is "from" the Information Retrieval Application mechanism, meaning that the InformationRetrievalInterface class is part of the Information Retrieval Application mechanism.

FIG. 14 shows the InformationRetrievalInterface class with a "has" relationship to three object classes called BuildIndex, LoadDocument, and Query Index, respectively. That is, the InformationRetrievalInterface class is comprised of objects from the classes called BuildIndex, LoadDocument, and QueryIndex. Each of these object classes have a "C" in their object clouds, which indicates they are core classes, meaning their attributes and behaviors do not change according to user extensions of the framework. The relationships of these objects to the mechanism likewise do not change and also are shown as core. As noted above, the InformationRetrievalInterface category is extensible.

In the preferred embodiment, the functions of loading a document, building an index, and evaluating a query are initiated by application programs. These application programs can be embodied, and are represented here, as single objects of the respective object classes LoadDocument, BuildIndex, and QueryIndex. Those skilled in the art will recognize that the application programs need not be object oriented data structures or programming code.

Relationship of Information Retrieval Classes to Document, Store, and IR System

Figure 15:
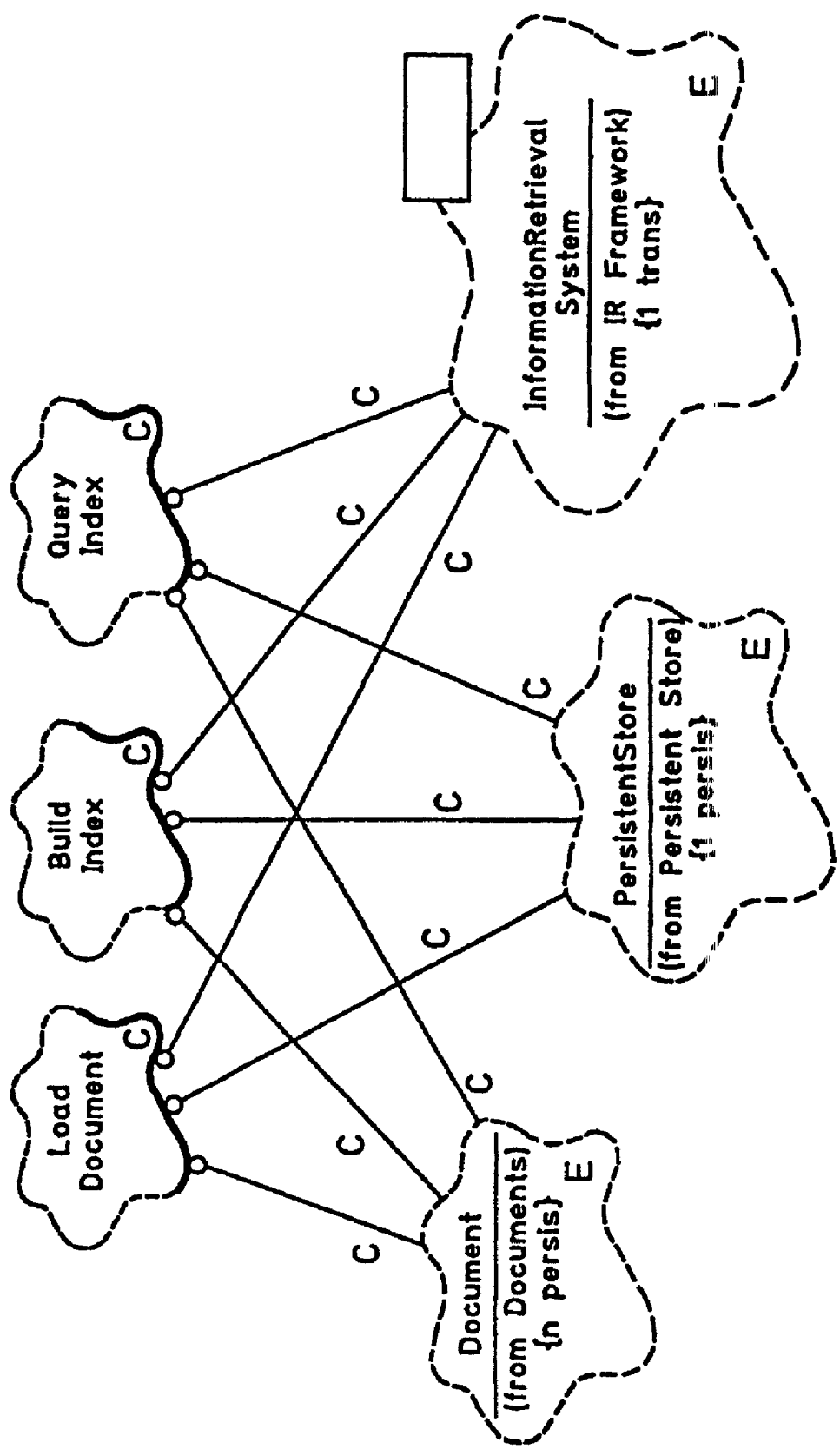
FIG. 15 is a class diagram representation of the Document, Persistent Store, and Information Retrieval System categories implemented by the computer processing system illustrated in FIG. 8 and their relationships with the objects of the information Retrieval Interface class.

FIG. 15 shows the relationships of the three InformationRetrievalInterface class objects (LoadDocument, BuildIndex, QueryIndex) with the Document, PersistentStore, and InformationRetrievalSystem class objects implemented by the computer processing system illustrated in FIG. 8.

FIG. 15 shows that objects of the three InformationRetrievalInterface classes have "using" relationships with objects of the classes Document, PersistentStore, and InformationRetrievalSystem. That is, objects of the LoadDocument, BuildIndex, and QueryIndex classes depend on objects of the Document, PersistentStore, and InformationRetrievalSystem classes for certain services. The Document class contains the actual binary representations of the documents comprising the test documents, binary documents, and annotation text documents described above. The PersistentStore class contains objects that maintain storage of the documents stored by the LoadDocument objects and also of the index data structures that are created by the BuildIndex objects and accessed by the QueryIndex objects. Finally, the InformationRetrievalSystem class contains objects that perform the storing, indexing, and query processing utilized by the LoadDocument, BuildIndex, and QueryIndex objects.

InformationRetrievalSystem Class Components

Figure 16:
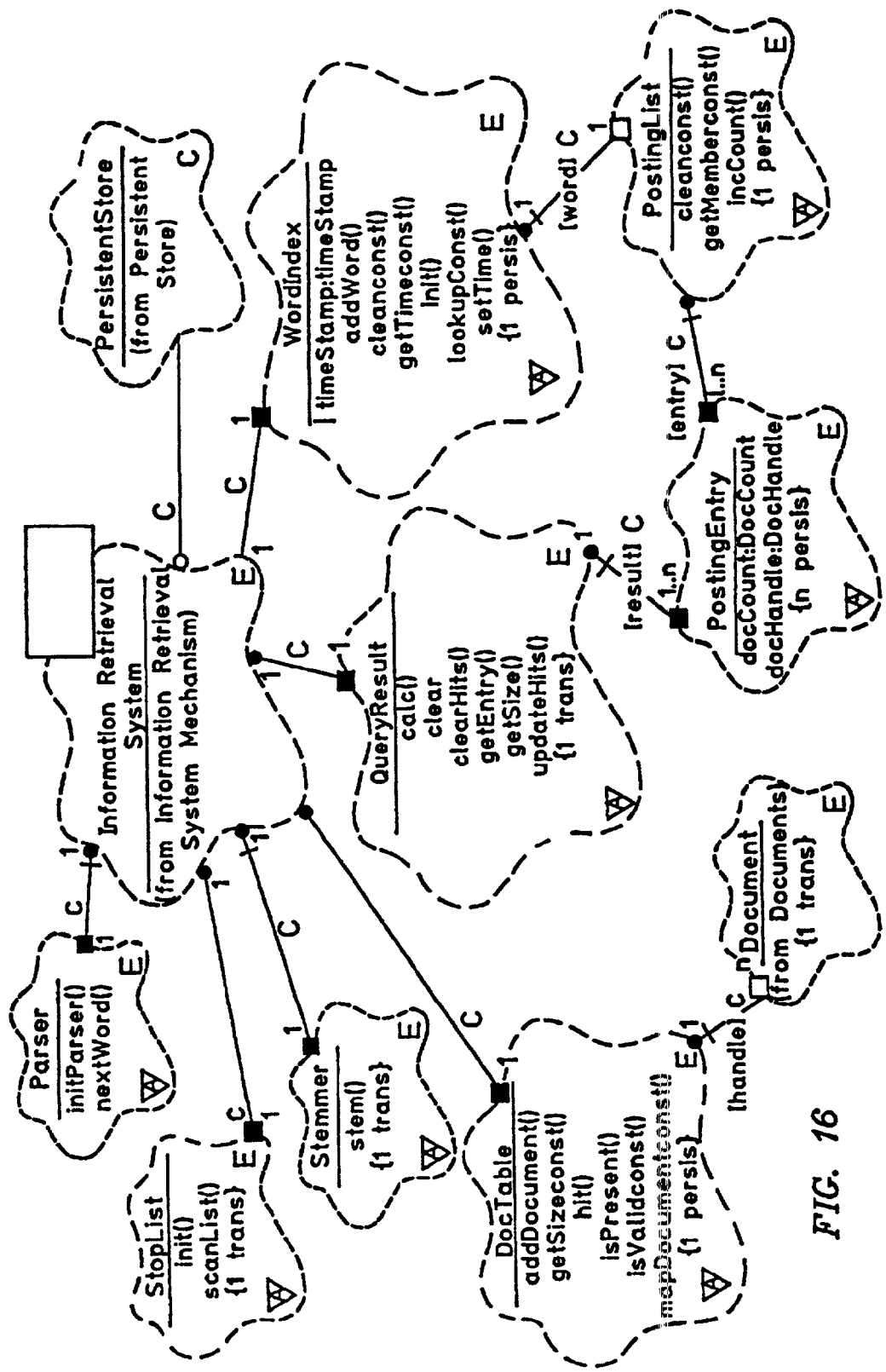
FIG. 16 is a class diagram representation of the Information Retrieval System category and components implemented by the computer processing system illustrated in FIG. 8.
Figure 17:
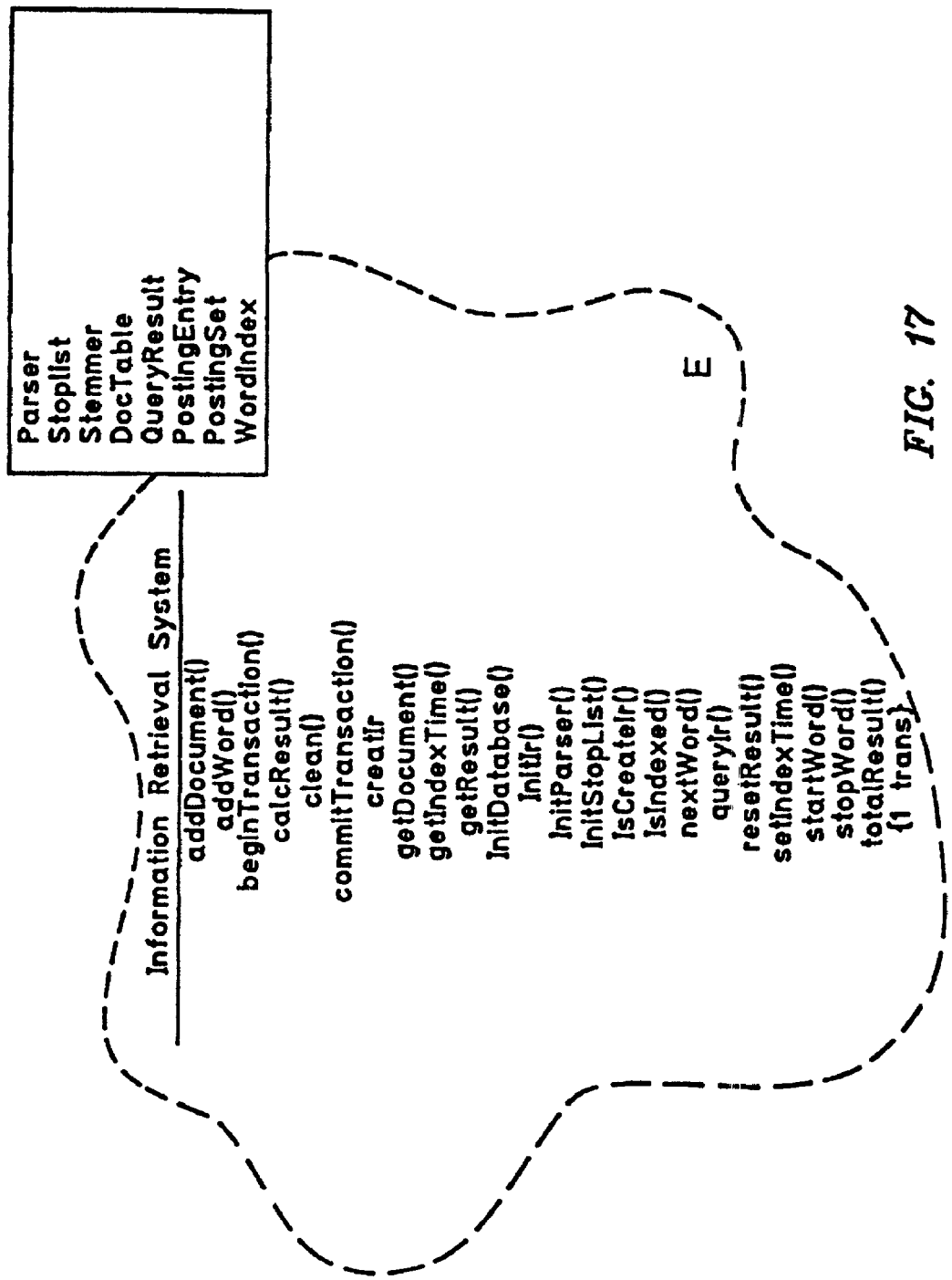
FIG. 17 is a class diagram representation showing the methods of the Information Retrieval System class implemented by the computer processing system illustrated in FIG. 8.

FIG. 16 shows details of the InformationRetrievalSystem class and its associated classes and objects. FIG. 16 shows the InformationRetrievalSystem class with "has" relationships with classes called Parser, Stoplist, Stemmer, DocTable, and QueryResult. The InformationRetrievalSystem class also has a "using" relationship to the PersistentStore class and has an association relationship with the WordIndex class. All of these classes are shown in FIG. 16 as abstract base classes, indicated by the uppercase block "A" within the triangle adornment of the respective object clouds. An abstract class is a class for which no instances may be created, the abstract class being a class of classes. The object cloud of each class shows the methods (also called functions or operations) of each class. FIG. 17 shows the methods of the InformationRetrievalSystem class.

The InformationRetrievalSystem class is a container for the other classes that make up the IR system and thereby provides a single interface to the IR system applications. The InformationRetrievalSystem class also interacts a with methods of its component objects. The InformationRetrievalSystem class is therefore extensible as a template class for objects of its component classes and as a template for other InformationRetrievalSystem classes. As a template for other objects, it permits different parsers, stoplists, and word indexes to be used by the system, so long as they meet the interface requirements of the classes. As a template for other InformationRetrievalSystem classes, it permits override of object methods, so that a method can interact differently from the default method, if desired by a framework user, and can interact with different objects of the component classes, if desired by a framework user. Thus, this aspect of the framework can be extended in both the components and the ways in which those components interact.

The Parser, Stoplist, and Stemmer classes include methods that perform the functions described above in conjunction with the flow diagrams of FIGS. 9 through 12. The WordIndex class is responsible for mapping word stems to the PostingList class, which contains PostingEntry class objects. The QueryResult class contains the results of a received user query and performs the calculations to provide the relevancy-ranked list of documents that relate to a query. The DocTable class maps the document handles to the documents, as described above in the description of FIGS. 9–12. Finally, the PersistentStore class manages the data storage interactions with the various InformationRetrievalSystem components.

FIG. 16 shows the methods of the component classes of the InformationRetrievalSystem. The objects of the Parser class include a method called initParser( ) that initializes a Parser object, which then can perform parsing on a text document or annotation text document. The Parser objects also include a method called nextWord( ) that obtains the next word of the document being parsed; that is, the nextWord( ) method discards blank spaces from a document. The Stoplist objects include a method called init( ), which initializes a Stoplist object for performing the stoplist checking described above The Stoplist objects also have a method (called scanList( ), which each word of a document being checked against a list of words (the "stoplist") that are to be deleted from a document when encountered. The Stemmer objects include a method called stem( ), which performs the stemming operation. As noted above in the description of the system flow diagrams, the stemming operation replaces words with associated stems.

The DocTable class is shown in FIG. 16 with a "has" relationship to Document objects. The relationship is indicated as being defined by the document handle, which means that each Document object is referenced through a document handle. The DocTable class comprises an abstract base class, as indicated by the uppercase block "A" within the triangle adornment of the object cloud. Thus, the DocTable class contains Document objects. There is a Document object for each type of document contained in the Information Retrieval system (that is, text documents and binary documents), which are accessed through the DocTable objects.

FIG. 16 shows that the DocTable class includes methods called addDocument( ), clean( ), getSizeConst( ), init( ), isPresent( ), isValidConst( ), mapDocumentConst( ), and mapDocumentConst( ). The "Const" methods are methods that have been designated read-only, for reasons of data concurrency. In particular, concurrent threads of functions such as query functions can be implemented without write-locking document objects if only "Const" methods are utilized for the query functions. This permits greater versatility to be achieved without complicated data construction.

The addDocument( ) method of the DocTable class stores a document object in the system according to the document handle. The clean( ) method deletes a Document object from the system. The getSizeConst( ) method is a method that returns the size constraint of a document. The init( ) method initializes a Document object in terms of its data values, before a binary document is loaded into storage. The isPresent( ) method returns an indication of whether a given Document object can be located in the IR system storage. The isValidConst( ) method is a check for valid document entries. As noted above, documents can be deleted from the document table data structure without first being deleted from the data base; the isValidConst( ) method returns an indicator of whether a document is deleted from the document table. Finally, the mapDocumentConst( ) method returns the storage location corresponding to a document handle; it is the pointer that links a document handle and its document.

FIG. 16 shows the QueryResult class with a "has" relationship to the PostingEntry class, linked by the query results. The QueryResult class includes methods called calc( ), clear( ), getEntry( ), getSize( ), and updateHits( ). The calc( ) method carries out the relevancy ranking calculation in response to a received user query. The clear( ) method initializes the query result processing data structures. The getEntry( ) method retrieves a posting entry of the posting list. The getSize( ) method returns the number of query results. The updateHits( ) method updates the query results for each query term.

The methods of the WordIndex class are responsible for the mapping of words to posting entries and include addWord( ), cleanConst( ), getTimeConst( ), init( ), lookupConst( ), and setTime( ). The WordIndex class cloud indicates a timeStamp attribute that is protected from access, meaning that a time stamp value associated with a word index object can be accessed only by objects of the WordIndex class or objects designated friend objects of the class.

The addWord( ) method of the WordIndex class adds entries to the word index data structure that correspond to words (or stems) located in a document. For example, if the word "computer" is found in a document, then the addWord( ) method adds a reference to that document into the word index data structure. The cleanConst( ) method deletes word index entries corresponding to a deleted document. The getTimeConst( ) method retrieves the time stamp value for index, which indicates when the index was last updated. This is used to find new documents that must be indexed. The init( ) method initializes the word index class upon extension of the information retrieval framework. The lookupConst( ) method retrieves a posting list entry for a word. The setTime( ) method places a time stamp value associated with the index.

The PostingList class is shown having methods called cleanConst( ), getMemberConst( ), and incCount( ). The cleanConst( ) deletes entries relating to a deleted document. The getMemberConst( ) method retrieves a posting entry for a document and the incCount( ) method increments a frequency count for a document word during index build.

Methods of the InformationRetrievalSystem Class

FIG. 17 shows the methods of the InformationRetrievalSystem class and in the rectangular box also shows the parameter list for the class. The addDocument( ) method of the class adds a Document object to the IR system. The addWord( ) method adds a word to the word index. The calcResult( ) method initiates processing for evaluation of a user query. The clean( ) method initiates deletion processing for a document that is deleted from the data base by a user, and in turn causes the clean( ) methods of the corresponding component classes to be executed. The commitTransaction( ) method causes a transaction, such as a deletion or document load, to be committed. The createIR( ) method creates an instantiation of the information retrieval system.

There are several "get" methods: the getDocument( ) method retrieves a document, the getIndexTime( ) method retrieves a time stamp value for the word index, and the getResult( ) method retrieves the results of query processing from the QueryResult class. Other methods of the InformationRetrievalSystem class include initDatabase( ), which initializes the document data base of the IR system, following initialization of the IR system itself. The initParser( ) method causes initialization of a Parser object and the initStopList( ) method causes initialization of a Stoplist object. The isCreateIR( ) method checks to determine if the IR system has been instantiated. The isIndexed( ) method checks to determine if a Document object has been indexed. The nextWord( ) method is used to retrieve the next word in a document during the text preprocessing operations.

The queryIR( ) method initiates processing of a user query. The resetResult( ) method initializes a QueryResult object. The setIndexTime( ) causes execution of the setTime( ) method of the WordIndex class. The stemWord( ) method causes the stemming operation to be performed on a document and the stopWord( ) method causes the stoplist processing to be performed on a document. Finally, the totalResult( ) returns the number of query results by calling the getSize( ) method of the QueryResult object.

Document Class and Components

Figure 18:
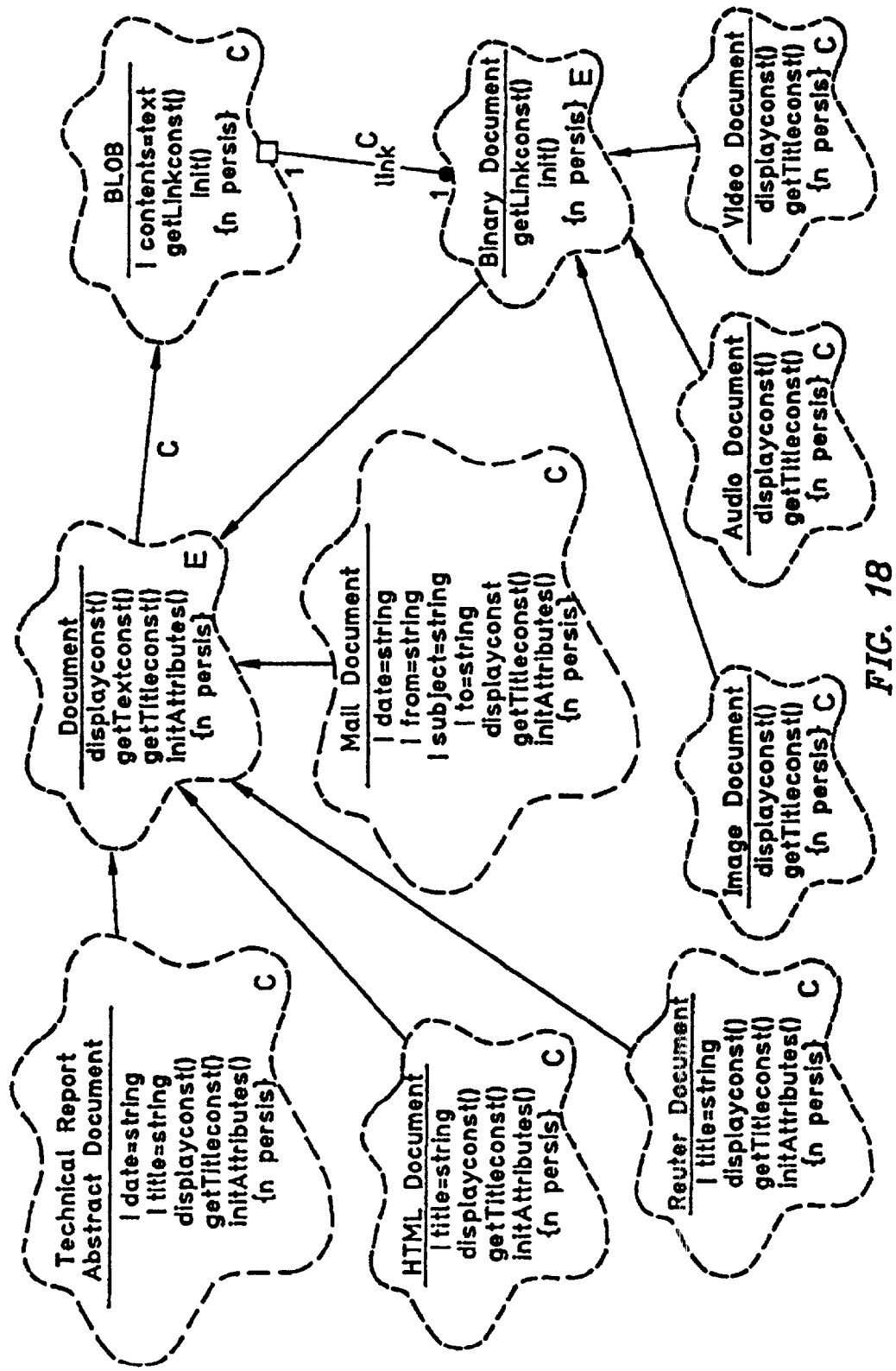
FIG. 18 is a class diagram representation showing the Document category and components implemented by the computer processing system illustrated in FIG. 8.

FIG. 18 shows the methods and attributes of the Document class and its component classes. As noted above, a Document object is a collection of bits comprising a binary large object (BLOB) and includes methods for interpreting the bits as a text document. Thus, if the BLOB is not itself a text document, an annotation text that in some way describes the BLOB is associated with it. Specialized Document objects can be created for different types of BLOBs. For example, objects confirming to Hyper Text Mark-Up Language (HTML), Mail, Reuter's News Service, Technical Reports Abstracts, and other formats can be defined. Such exemplary extensions of the Document object are shown in the class diagram of FIG. 18 for purposes of illustration and are indicated as having inheritance relationships to the Document class.

A particular type of Document object called a BinaryDocument is used for documents that do not contain text. FIG. 18 shows three exemplary extensions called ImageDocument, AudioDocument, and VideoDocument. These objects comprise two objects, a binary object containing the raw binary data (a BLOB) and an annotation text object containing a text Document object that characterizes the BLOB data and is used for indexing. FIG. 18 shows that the annotation text BinaryDocument objects are linked to the actual BLOB object by a reference. Using two objects for representation of BLOB documents permits indexing of multimedia documents having non-text information and provides improved performance because the entire BLOB document does not have to be retrieved during indexing or query processing. Rather, only the smaller annotation text need be retrieved.

Other customized or special-purpose document classes can he created by the framework user by inheritance from the Document class in the case of new types of text documents and by inheritance from the BinaryDocument class in the case of new types of binary documents. Methods that are unique to the new document types can be overridden.

FIG. 18 shows the methods of the Document class include displayConst( ), getTextConst( ), getTitleConst( ), and initAttributes( ). As noted above, all "Const" methods are read-only methods and do not change data structures. The displayConst( ) method displays a document to an IR system user. The getTextConst( ) method retrieves text of a Document object from the IR system storage. The getTitleConst( ) method retrieves the title of a Document object. The initAttributes( ) method initializes the condition of a Document object. The BLOB class and BinaryDocument class include init( ) and getLinkConst( ) methods that initialize such objects and retrieve the BLOB-BinaryDocument link, respectively.

FIG. 18 shows that the inheritance objects do not necessarily include all of the methods defined for the Document class and that other methods can be defined. For example, the MailDocument objects include protected attributes of date, source (from), subject, and addressee (to).

PersistentStore Class and Components

Figure 19:
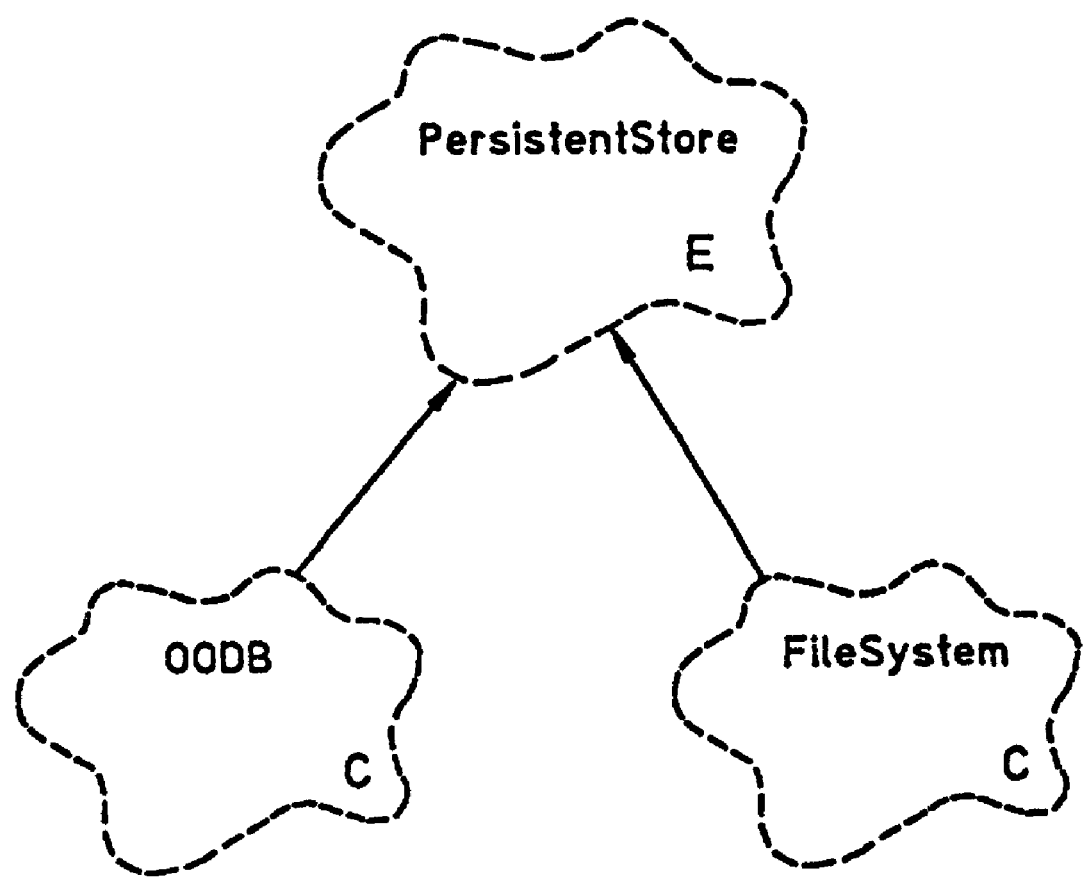
FIG. 19 is a class diagram representation of the Persistent Store category and components implemented by the computer processing system illustrated in FIG. 8.

The documents and indexes of the IR system are maintained in data storage and are represented through a PersistentStore class of objects. The PersistentStore class is illustrated in the class diagram of FIG. 19 as including an object oriented data base object called OODB and a file system object called FileSystem. Those skilled in the art will appreciate that OODB type objects have benefits such as transaction capability and document attribute query capability that provide greater versatility as compared with file system type documents.

Scenario Diagrams

The operating steps performed by the Information Retrieval (IR) system constructed in accordance with the present invention will be better understood with reference to object interaction diagrams, which those skilled in the art will appreciate show the processing for an object oriented programming implementation having the object classes and methods as described above. The object scenario diagrams of FIGS. 20, 21, 22, and 23A and 23B illustrate processing carried out in performing the load document, build index, and query processing. Although query processing generally can be performed only after indexes are built, and indexes can be built only after one or more documents are loaded, it should be understood that these three types of operations do not have to be performed in sequential order with every invocation of the IR system. That is, execution of an operation need not immediately follow a preceding operation.

Load Document Object Interactions

Figure 20:
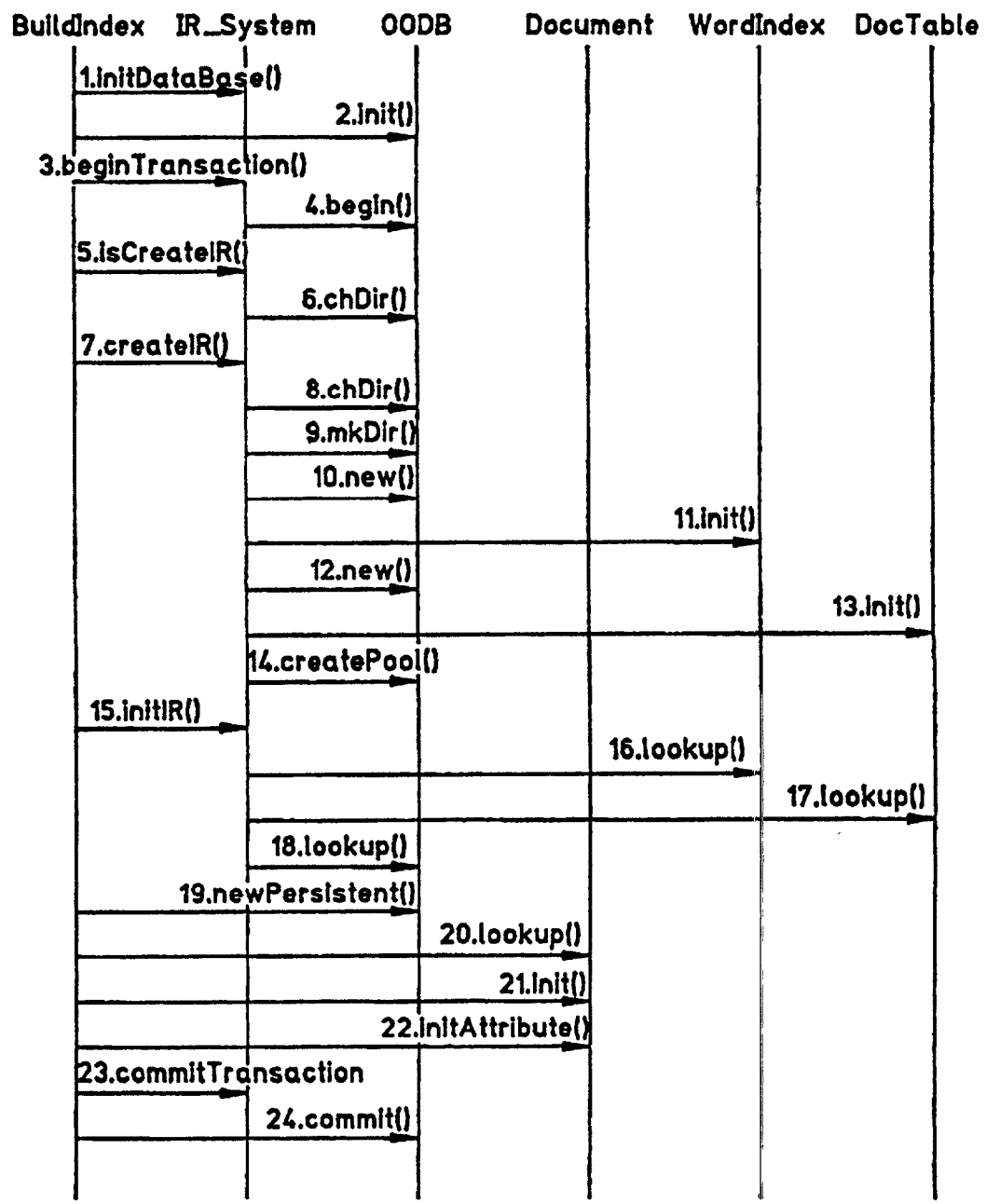
FIG. 20 is an interaction diagram representation of the load document processing performed by the computer processing system illustrated in FIG. 8.

FIG. 20 is a scenario diagram that illustrates the load document processing that is generally described in the procedural flow diagram of FIG. 10. More particularly, the processing steps represented by the FIG. 10 flow diagram (most readily understood in a procedural programming context) may also be described by corresponding object-scenario diagrams that relate to the object oriented programming context, in view of the class diagrams of FIGS. 14–19. As noted above, the IR_System object provides the interface for the applications that must be executed. Thus, most operations of the IR system in response to user commands are initiated through the IR_System object.

The actual loading of a document into the data base cannot begin before the data base itself is created, so FIG. 20 shows that processing begins with initialization of the document data base, as represented by the connecting line extending from the BuildIndex object line to the IR_System object line with the legend "1. initDataBase( )", representing a method call. The next illustrated operation assumes that an object oriented data base is implemented, as indicated by the legend "2. init( )" on the connecting line from the BuildIndex object line to the OODB object line.

The IR_System object then can begin load document processing, as represented by the legend "3. beginTransaction( )" from BuildIndex to IR_System and "4. begin( )" from IR_System to OODB. The next processing operations check for existence of the IR system and its components; if the IR system has not been created, then the appropriate operations are executed. First, the BuildIndex object checks to determine if the IR system has been created, as represented by the legend "5. isCreateIR( )" on the connecting line from BuildIndex to IR_System. The IR_System objects carries out this processing by performing a check directory function on the OODB object, represented by the legend "6. chDir( )" on the connecting line from IR_System to OODB. Assuming the IR system must still be created, the BuildIndex object initiates creation of the IR system components, represented in FIG. 20 by the connecting line from BuildIndex to IR_System with "7. createIR( )".

Next, checking a directory, creating a directory, and instantiating appropriate OODB objects are indicated by "8. chDir( )" and "9. mkDir( )" on the connecting line from the IR_System object line to the OODB object line. Creation and initialization of a new WordIndex object are represented by "10. new( )" on the connecting line from IR_System to OODB and by "11. init( )" on the connecting line from IR_System to WordIndex. Similarly, creation and initialization of a new DocumentTable object are represented by "12. new( )" on the connecting line from IR_System to OODB and "13. init( )" on the line from IR_System to DocTable. Creation of the OODB class object for holding the data base entries is represented by the legend "14. createPool( )" on the connecting line from the IR_System object line to the OODB object line. Initialization of the IR system and all of the component objects is represented by "15. initIR( )" from Build Index to IR_System. The final IR system creations operations are indicated by respective 16, 17, and 18 "lookup" operations from the IR_System object line to the WordIndex, DocTable, and OODB object lines.

After the IR system is created, a Document object of the appropriate type is created. This operation is represented by the legend "19. newPersistent( )" on the connecting line from the BuildIndex object line to the OODB object line. If the particular type of Document object already exists, then the IR system retrieves its reference. This processing is represented in FIG. 20 by the legend "20. lookup" on the connecting line from the IR_System object line to the Document object line.

The Document object contents are initialized next (represented by "21. init( )" on the connecting line from BuildIndex to Document), followed by initialization of the Document attributes (represented by "22. initAttributes( )" on the same connecting line). Lastly, the transaction is committed, meaning that all operations are executed, confirmed, and logged in the computer that supports the IR system. The commit operations are represented by "23. commitTransaction( )" from BuildIndex to IR_System and by "24. commit( )" from IR_System to OODB. The Document object is now loaded into the storage of the computer system and is part of the IR system data base.

Build Index Object Interactions

Figure 21:
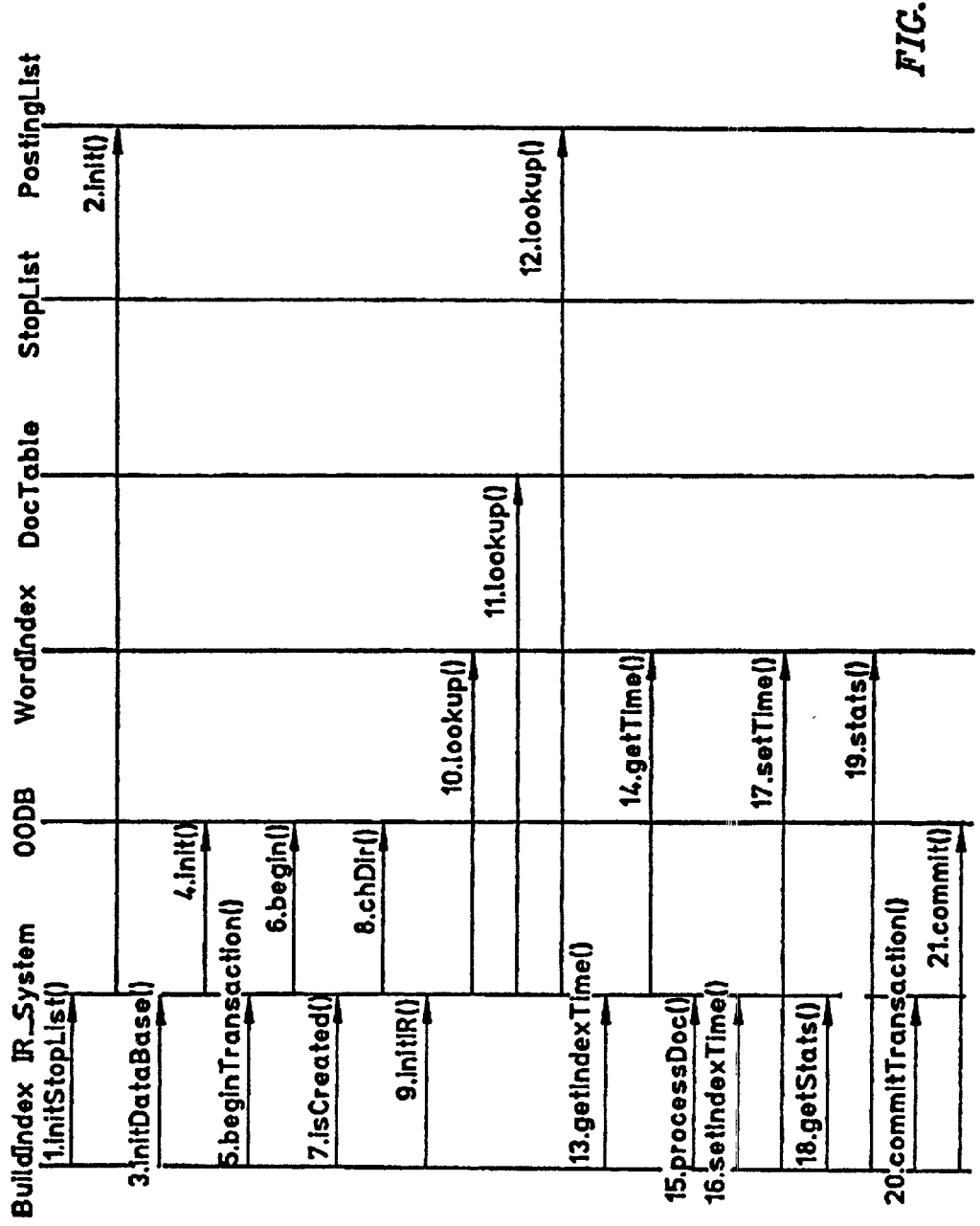
FIG. 21 is an interaction diagram representation of the build index processing performed by the computer processing system illustrated in FIG. 8.

FIG. 21 is a scenario diagram that illustrates the build index processing that is generally described in the procedural flow diagram of FIG. 11. That is, the processing steps represented by the FIG. 11 flow diagram are also described by the corresponding FIG. 21 object-scenario diagram. The build index processing begins with initialization of a Stoplist object, as represented by the legend "1. initStopList( )" on the connecting line from the BuildIndex object line to the IR_System object line, and also initialization of a PostingList object, as represented by the legend "2. init( )" on the connecting line from IR_System to PostingList. Initialization of the data base, if it does not already exist, is represented by "3. initDataBase( )" from BuildIndex to IR_System and by "4. init( )" from IR_System to OODB.

The beginning of the build index processing transaction is indicated by "5. beginTransaction( )" from BuildIndex to IR_System and by "6. begin( )" from IR_System to OODB. If the IR system component objects have not yet been created, then an error condition must be indicated to the IR system user. Therefore, the next processing operations involve a check for creation of the system components, represented by "7. isCreated( )" on the connecting line from the BuildIndex object line to the IR_System object line to request a check, and then a call from the IR_System object to a check directory method of the OODB object, represented by "8. chDir( )" on the connecting line from the IR_System object line to the OODB object line.

If the IR system components have been created, then the next operations involve initialization of the system so the indexes can be built. Thus, the next operation to be executed is the initialization processing, represented by "9. initIR( )" from BuildIndex to IR_System and by subsequent lookup method calls by the IR_System object to WordIndex, DocTable, and PostingList represented by "10. lookup( )", "11. lookup( )", and "12. lookup( )", respectively. Next, the index is associated with a tin restamp value indicating its time of creation, so the next processing operation is to get an Index timestamp value, represented by "13. getIndexTime( )" from BuildIndex to IR_System and "14. getTime( )" from IR_System to WordIndex.

Next, the Document object(s) are processed to add to the Index object. The processing operations involved are represented in FIG. 21 by the single entry "15. processDoc( )" for simplicity of this explanation. In the preferred embodiment, there is no object method called processDoc( ). The actual document processing operations are illustrated in greater detail in the scenario diagram of FIG. 22 and are explained further below.

The next operation is to reset the index time to the maximum time value associated with computer system storage. This is done for easier, more accurate file maintenance and tracing. The index time operations are represented by "16. setIndexTime( )" and "17. setTime( )". After the index time is established, the system retrieves index statistics comprising the word frequency values and the like, storing them into the WordIndex. This processing is represented by "18. getStats( )" from BuildIndex to IR_System and "19. stats( )" from IR_System to WordIndex.

The last operations performed in conjunction with build index processing relate to committing the transaction, represented by "20. commitTransaction( )" from BuildIndex to IR_System and "21. commit( )" from IR_System to OODB.

Document Processing Object Interactions of the Build Index Processing

Figure 22:
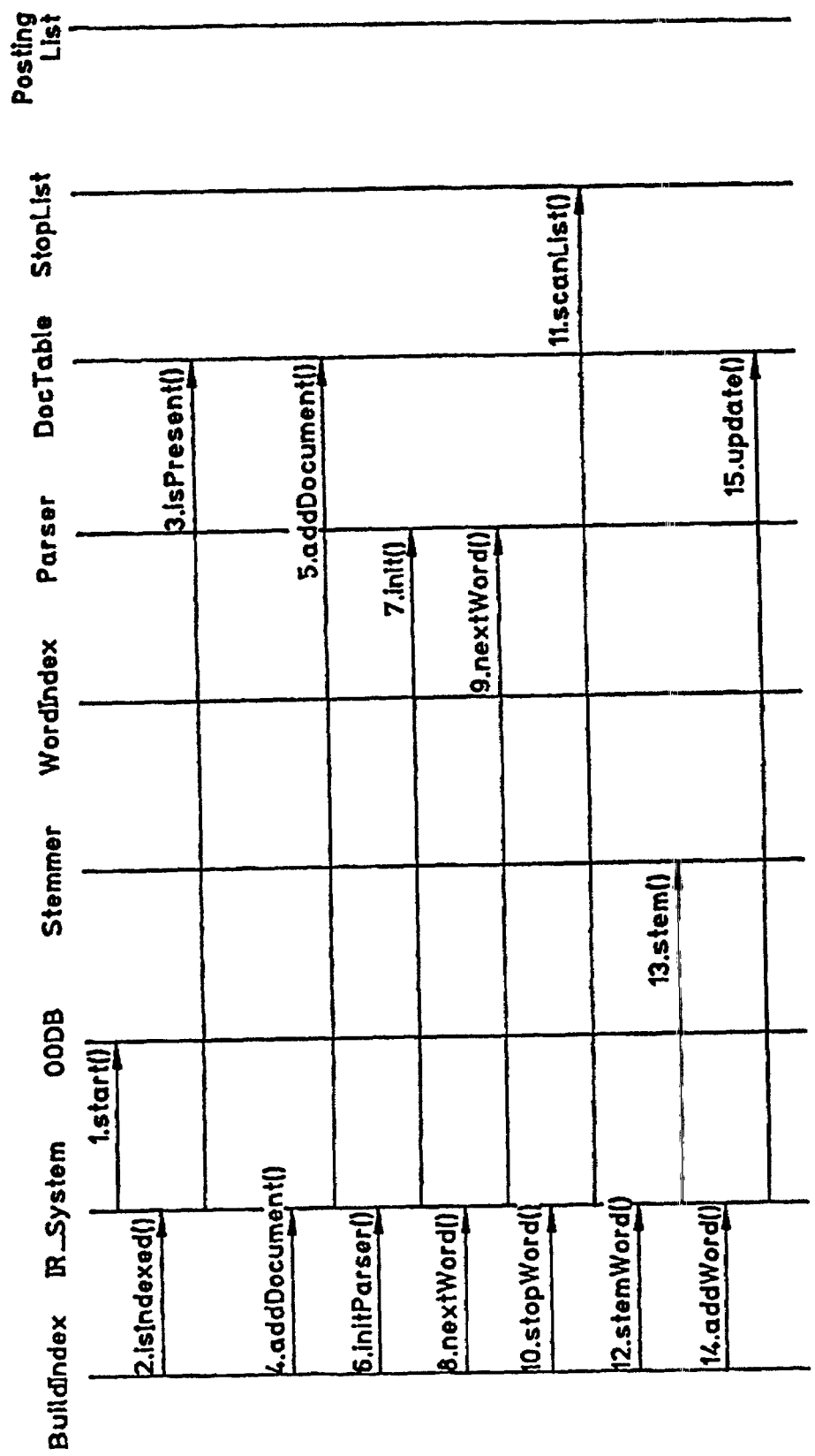
FIG. 22 is an interaction diagram representation of the document processing operations of the build index processing illustrated in FIG. 21.

FIG. 22 is a scenario diagram that illustrates the processing represented by the single entry "15. processDoc( )" in FIG. 21. This processing adds the appropriate entries to the index objects. The first operation is to determine if the time of modification for a Document is greater than the index timestamp. If it is, and if the earlier object was indexed, then the older copy of the Document should be deleted because the text has since been changed. This processing is represented by the legends "1. stat( )" from IR_System to OODB, "2. isIndexed( )" from BuildIndex to IR_System, and "3. isPresent( )" from IR_System to DocTable.

Next, the IR system adds the Document to the document table, which is represented by the request to the IR_System to add ("4. addDocument( )" from BuildIndex to IR_System) followed by the addition ("5. addDocument( ) from IR_System to DocTable. After the Document is added to the DocTable, it must be parsed. Thus, the IR system first initializes a parser. This processing is represented by "6. initParser( )" from BuildIndex to IR_System and by "7. init( )" from IR_System to Parser.

The next document processing operations involve stoplist processing and stemming, word by word in a document, followed by adding the resulting information to the indexes. These operations are represented by "8. nextWord( )" from the BuildIndex object line to the IR_System object line and "9. nextWord( )" from the IR_System object line to the Parser object line, and then "10. stopWord( ) from the BuildIndex object line to the IR_System object line and then a "11. scanList( )" call on the connecting line from the IR_System object line to the StopList object line. The stemming operation is represented by "12. stemWord( )" from BuildIndex to IR_System and "13. stem( )" from IR_System to Stemmer.

Finally, the result of processing the word of the Document is added to the indexes, as represented by "14. addWord( )" on the connecting line from the BuildIndex object line to the IR_System object line and "15. update( )" on the connecting line from IR_System to DocTable.

Query Result Processing Object Interactions

Figure 23A:
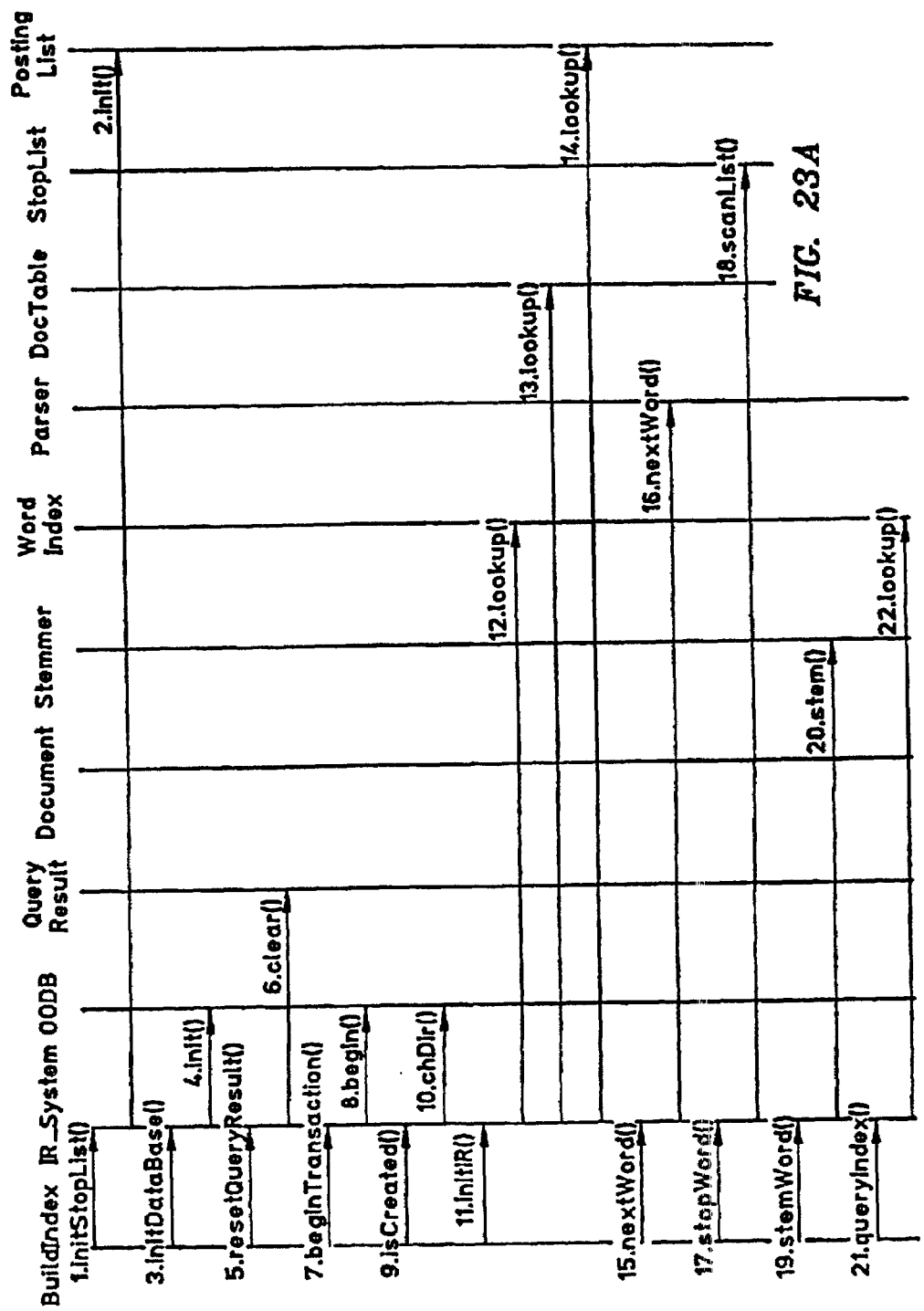
FIG. 23A and FIG. 23B are interaction diagram representations for the query processing performed by the computer processing system illustrated in FIG. 8.
Figure 23B:
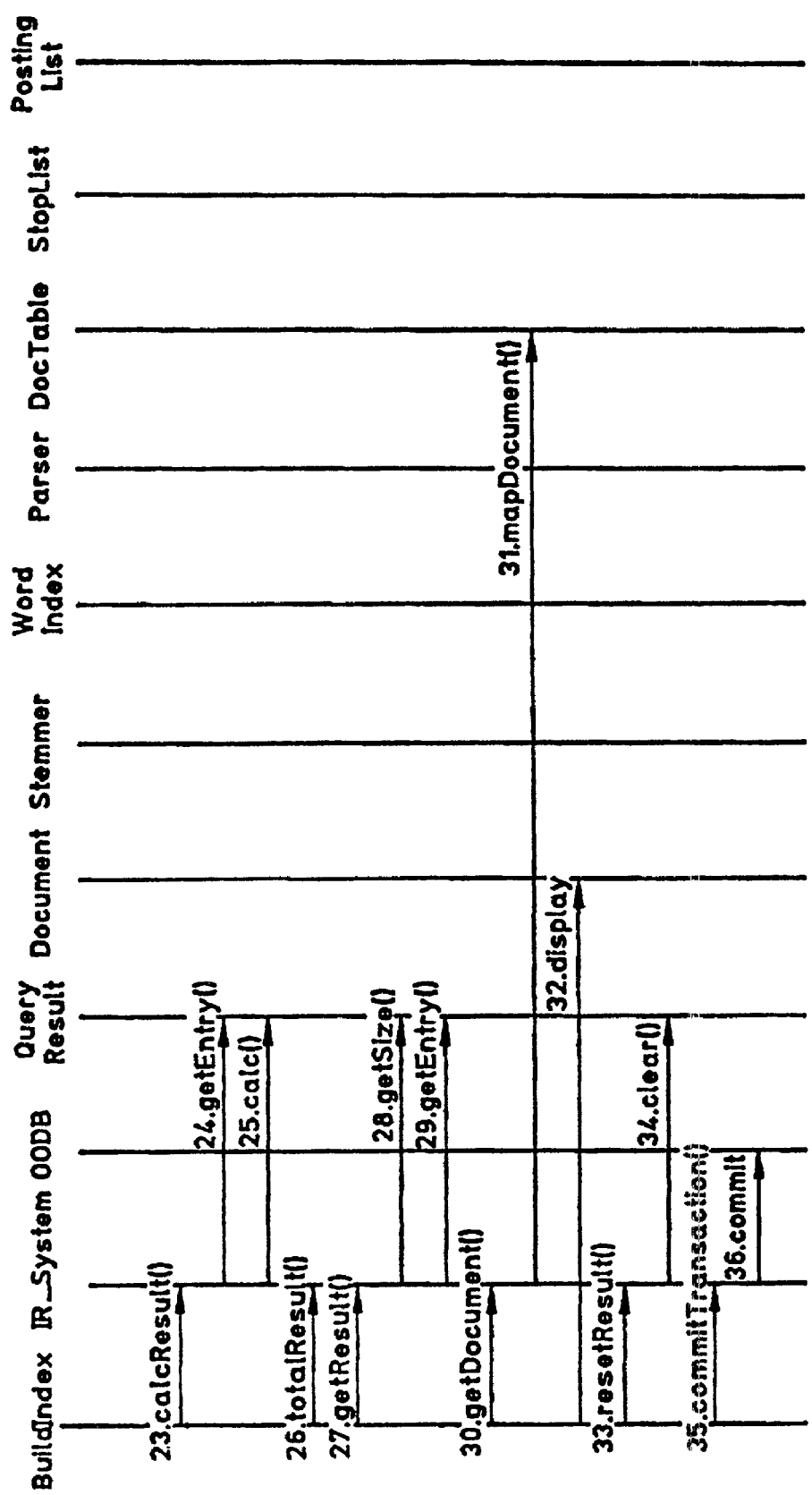

After a document has been loaded into the system data storage, and indexed, the system indexes can be compared against a received user query to provide a query result that identifies the most relevant documents in the system data storage for user retrieval. FIG. 23A and FIG. 23B are scenario diagrams that illustrate the query result processing that is generally described in the procedural flow diagram of FIG. 13. That is, the processing steps represented by the FIG. 13 flow diagram are also described by the corresponding FIGS. 23A, 23B object-interaction diagrams. The query result processing steps begin on FIG. 23A and continue on FIG. 23B.

The first operation of query result processing is to obtain the posting list for the query, beginning with initialization of the stoplist. This is represented in FIG. 23A by "1. initStopList( )" on the connecting line from the BuildIndex object line to the IR_System object line and by "2. init( )" on the connecting line from the IR_System object line to the PostingList object line. The data base also must be initialized, and is represented by "3. initDataBase( )" from BuildIndex to IR_System and by "4. init( )" from IR_System to OODB. A QueryResult object must be reset, to receive the next processing results. This is represented in FIG. 23A by "5. resetQueryResult( )" and "6. clear( )".

The beginning of the query result processing transaction is indicated by "7. beginTransaction( )" on the connecting line from BuildIndex to IR_System and by "8. begin( )" on the connecting line from IR_System to OODB. If the IR system component objects have not yet been created, then an error condition must be indicated to the IR system user. Therefore, the next processing operations involve a check for creation of the system components, represented by "9. isCreated( )" on the connecting line from the BuildIndex object line to the IR_System object line to request a check, and then a call from the IR_System object to a check directory method of the OODB object, represented by "10. chDir( )" on the connecting line from the IR_System object line to the OODB object line.

If the IR system components have been created, then the next operations involve initialization of the system so the indexes can be built. Thus, the next operation to be executed is the initialization processing, represented by "11. initIR( )" from BuildIndex to IR_System and by subsequent lookup method calls by the IR_System object to WordIndex, DocTable, and PostingList represented by "12. lookup( )", "13. lookup( )", and "14. lookup( )", respectively. Next, each term of the query must be stoplist checked and stemmed. The stoplist operations are represented by "15. nextWord( )" from BuildIndex to IR_System, which initiates the processing, and then the IR_System object response, represented by "16. nextWord( )" from IR_System to Parser, "17. stopWord( )" from BuildIndex to IR_System, "18. scanlist( )" from IR_System to StopList. The stemming operations are represented by "19. stemWord( )" from BuildIndex to IR_System and by "20. stem( )" from IR_System to Stemmer.

After the query is stoplist checked and stemmed, it is applied term by term to the indexes for matching. The precise type of processing and operating steps involved in carrying out the matching can vary greatly, depending on the desires of the framework user and the IR system designer. The details of what type of matching scheme best serves the needs of the user will be known to those skilled in the art without further explanation and can be suitably selected. The execution of query matching is represented in FIG. 23A by "21. queryindex( )" from BuildIndex to IR_System and by "22. lookup( )" from IR_System to WordIndex.

The query result processing operation steps are continued on FIG. 23B, which shows that the next operation is to obtain the query result comprising the matches collected for all the terms of the query. This is represented by "23. calcResult( )" from BuildIndex to IR_System, "24. getEntry( )" and "25. calc( )" from IR_System to QueryResult, "26. totalResult( )" and "27. getResult( )" from BuildIndex to IR_System, and by "28. getSize( )" and "29. getEntry( )" from IR_System to QueryResult. More particularly, these operations call for the IR_System to calculate the result and retrieve the resulting QueryResult object for each query term, and then for the IR_System object to obtain the total query result by collecting the appropriate QueryResult objects.

As the next part of query result processing, the IR system permits the user to select one of the identified documents and retrieves it. This is represented by "30. getDocument( )" from BuildIndex to IR_System. In response, the IR_System object gets the document handle from the document table, retrieves the document identified by the document handle, and displays the retrieved document to the user. These operations are represented in FIG. 23B by "31. mapDocument( )" from IR_System to DocTable and by "32. displays" from BuildIndex to Document.

To finish the query result processing, the query result is reset and then the query transaction is committed. These operations are represented by "33. resetResult( )" and "34. clear( )" and by "35. commitTransaction( )" and "36. commit( )", respectively.

Other system end processing related to the object oriented programming environment is not necessarily associated with the end of query result processing, but was described above in conjunction with the flow diagram of FIG. 9, the details of which will be apparent to one skilled in the art given the explanation above. For example, those skilled in the art will know that object oriented destructor methods are necessary to delete instantiated objects from the computer system storage and to performing garbage collection processing, if desired.

The embodiments and examples set forth herein were presented in order to best explain the present invention and its practical application and to thereby enable those skilled in the art to make and use the invention. However, those skilled in the art will recognize that the foregoing description and examples have been presented for purposes of illustration and example only. The description as set forth is not intended to be exhaustive or to limit the invention to the precise form disclosed. Many modifications and variations are possible in light of the above teaching without departing from the spirit and scope of the claims below.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2d ed. (1994), available from The Benjamin/Cummings Publishing Company, Inc., Redwood City, Calif., USA. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to as a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute timer( )", "add_animal( )", and "add_containment_unit( )". Words in the operation names (and class attribute names) are sometimes separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass. Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see Chapter 5 of the Booch reference). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of both object diagrams (FIG. 7) and interaction diagrams (FIGS. 20–23B). Those skilled in the art will recognize that both types of diagrams are equivalent in terms of the information they provide, and also will understand how to convert from one representation to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

I claim:

1. An apparatus comprising:
at least one processor;
a memory coupled to the at least one processor;
a user-extensible object oriented framework residing in the memory, the framework including at least one core function that cannot be modified by a user and at least one extensible function defined by a user to customize the framework and thereby define a desired information retrieval system, the framework including:
a load document processor that loads and preprocesses a plurality of documents;
an index processor that creates at least one word index corresponding to the plurality of documents; and
a query processor that receives a query and determines if any of the plurality of documents match the query by processing the query and comparing the processed query to the plurality of words in the at least one word index, thereby providing a query result.

2. The apparatus of claim 1 wherein the index processor creates at least one word index in response to a build index request from a user.

3. The apparatus of claim 1 wherein the framework further includes:
a frequency counter that indicates the number of times a word appears in the at least one word index.

4. The apparatus of claim 1 wherein the framework further includes:
a table that maps a word index to the indexed document from which it was preprocessed.

5. The apparatus of claim 1 wherein the preprocessing by the load document processor includes a parsing method that identifies text words from other text characters.

6. The apparatus of claim 1 wherein the preprocessing by the load document processor includes a stoplist method that 1) identifies text words not containing sufficient information to be useful in providing a query result and 2) deletes such text words.

7. The apparatus of claim 1 wherein the preprocessing by the load document processor includes a stemming method that 1) identifies text word stems of which a text word is a formative, and 2) replaces the text word with the stem.

8. A computer readable program product comprising:
(A) a user-extensible object oriented framework mechanism comprising:
(1) a load document processor that loads and preprocesses a plurality of documents;
(2) an index processor that creates at least one word index corresponding to the plurality of documents; and
(3) a query processor that receives a query and determines if any of the plurality of documents match the query by processing the query and comparing the processed query to the plurality of words in the at least one word index, thereby providing a query result; and
(B) recordable media bearing the framework mechanism.

9. The program product of claim 8 wherein the index processor creates at least one word index in response to a build index request from a user.

10. The program product of claim 8 wherein the framework mechanism further includes:
a frequency counter that indicates the number of times a word appears in the at least one word index.

11. The program product of claim 8 wherein the framework mechanism further includes:
a table that maps a word index to the indexed document from which it was preprocessed.

12. The program product of claim 8 wherein the preprocessing by the load document processor includes a parsing method that identifies text words from other text characters.

13. The program product of claim 8 wherein the preprocessing by the load document processor includes a stoplist method that 1) identifies text words not containing sufficient information to be useful in providing a query result and 2) deletes such text words.

14. The program product of claim 8 wherein the preprocessing by the load document processor includes a stemming method that 1) identifies text word stems of which a text word is a formative, and 2) replaces the text word with the stem.

15. A method of retrieving information from a plurality of documents comprising the steps of:
(1) providing a user-extensible object oriented framework mechanism;

(2) extending the object oriented framework mechanism; and (3) executing the extended object oriented framework mechanism, the executing framework mechanism performing the steps of:

(A) loading and preprocessing a plurality of documents;

(B) creating at least one word index corresponding to the plurality of documents; and (C) receiving a query and determining if any of the plurality of documents match the query by processing the query and comparing the processed query to the plurality of words in the at least one word index, thereby providing a query result.

16. The method of claim 15 wherein the framework mechanism performs step (B) in response to a build index request from a user.

17. The method of claim 15 wherein the executing framework mechanism further preforms the step of counting the number of times a word appears in the at least one word index.

18. The method of claim 15 wherein the executing framework mechanism further preforms the step of mapping a word index to the indexed document from which it was preprocessed.

19. The method of claim 15 wherein the preprocessing of a document includes the step of identifying text words from other text characters.

20. The method of claim 15 wherein the preprocessing of a document includes the steps of:

1) identifying text words not containing sufficient information to be useful in providing a query result; and 2) deleting such text words.

21. The method of claim 15 wherein the preprocessing of a document includes the steps of:

1) identifying text word stems of which a text word is a formative; and 2) replacing the text word with the stem.

* * * * *